US008578002B1

(12) United States Patent  
Roesch et al.

(10) Patent No.: US 8,578,002 B1
(45) Date of Patent: Nov. 5, 2013

(54) SYSTEMS AND METHODS FOR DETERMINING CHARACTERISTICS OF A NETWORK AND ENFORCING POLICY

(75) Inventors: Martin Roesch, Eldersburg, MD (US); Ronald A. Dempster, Mount Airy, MD (US); Andrew Baker, Columbia, MD (US); Eric Gustafson, Ellicott City, MD (US)

(73) Assignee: Sourcefire, Inc., Columbia, MD (US)

( * ) Notice: Subject to any disclaimer, the term of this patent is extended or adjusted under 35 U.S.C. 154(b) by 0 days.

(21) Appl. No.: 12/969,682

(22) Filed: Dec. 16, 2010

Related U.S. Application Data

(63) Continuation of application No. 10/843,459, filed on May 12, 2004, now Pat. No. 7,949,732.

(60) Provisional application No. 60/469,395, filed on May 12, 2003.

(51) Int. Cl.
  *G06F 15/177* (2006.01)
  *G06F 15/173* (2006.01)
  *G06F 15/16* (2006.01)

(52) U.S. Cl.
  USPC ............ 709/220; 709/224; 709/230; 370/254

(58) Field of Classification Search
  USPC ........................... 709/220, 224, 230; 370/254
  See application file for complete search history.

(56) References Cited

U.S. PATENT DOCUMENTS

| 4,550,436 | A | 10/1985 | Freeman |
| 4,570,157 | A | 2/1986 | Kodaira |
| 4,857,912 | A | 8/1989 | Everett et al. |
| 4,912,748 | A | 3/1990 | Horii et al. |
| 4,985,863 | A | 1/1991 | Fujisawa et al. |
| 5,193,192 | A | 3/1993 | Seberger |
| 5,222,081 | A | 6/1993 | Lewis et al. |
| 5,404,488 | A | 4/1995 | Kerrigan et al. |

(Continued)

FOREIGN PATENT DOCUMENTS

| EP | 1 548 998 A1 | 6/2005 |
| EP | 2166725 A1 | 3/2010 |

(Continued)

OTHER PUBLICATIONS

Aho et al., "Efficient String Matching: An Aid to Bibliographic Search," *Communications from the ACM* (Jun. 1975), vol. 18, No. 6, pp. 333-340.

(Continued)

*Primary Examiner* — Ranodhi Serrao
(74) *Attorney, Agent, or Firm* — Posz Law Group, PLC

(57) ABSTRACT

A packet transmitted on a network is read and decoded. A network device and its operating system are identified by analyzing the decoded packet. If more than one operating system is identified from the decoded packet, the operating system is selecting by comparing confidence values assigned to the operating systems identified. A service running on the network device is identified from the decoded packet or subsequent packets that are read, decoded and analyzed. The network topology of a network is determined by reading, decoding, and analyzing a plurality of packets. A flow between two network devices is determined by reading, decoding, and analyzing a plurality of packets. Vulnerabilities are assigned to operating systems and services identified by reading, decoding, and analyzing packets. Network configuration policy is enforced on operating systems and services identified by reading, decoding, and analyzing packets.

4 Claims, 28 Drawing Sheets

(56) References Cited

U.S. PATENT DOCUMENTS

| | | | |
|---|---|---|---|
| 5,430,842 A * | 7/1995 | Thompson et al. | 709/236 |
| 5,459,841 A | 10/1995 | Flora-Holmquist et al. | |
| 5,495,409 A | 2/1996 | Kanno | |
| 5,497,463 A | 3/1996 | Stein et al. | |
| 5,604,910 A | 2/1997 | Kojima et al. | |
| 5,646,997 A | 7/1997 | Barton | |
| 5,666,293 A | 9/1997 | Metz et al. | |
| 5,796,942 A | 8/1998 | Esbensen | |
| 5,870,554 A * | 2/1999 | Grossman et al. | 713/2 |
| 5,881,269 A | 3/1999 | Dobbelstein | |
| 5,901,307 A | 5/1999 | Potter et al. | |
| 5,917,821 A * | 6/1999 | Gobuyan et al. | 370/392 |
| 5,919,257 A | 7/1999 | Trostle | |
| 5,963,942 A | 10/1999 | Igata | |
| 5,987,473 A | 11/1999 | Jorgensen | |
| 5,995,963 A | 11/1999 | Nanba et al. | |
| 5,999,937 A | 12/1999 | Ellard | |
| 6,002,427 A | 12/1999 | Kipust | |
| 6,141,686 A * | 10/2000 | Jackowski et al. | 709/224 |
| 6,199,181 B1 | 3/2001 | Rechef et al. | |
| 6,219,786 B1 | 4/2001 | Cunningham et al. | |
| 6,240,452 B1 | 5/2001 | Welch, Jr. et al. | |
| 6,259,805 B1 | 7/2001 | Freedman et al. | |
| 6,321,338 B1 | 11/2001 | Porras et al. | |
| 6,324,656 B1 | 11/2001 | Gleichauf et al. | |
| 6,334,121 B1 | 12/2001 | Primeaux et al. | |
| 6,343,362 B1 | 1/2002 | Ptacek et al. | |
| 6,393,474 B1 | 5/2002 | Eichert et al. | |
| 6,415,321 B1 | 7/2002 | Gleichauf et al. | |
| 6,453,354 B1 | 9/2002 | Jiang et al. | |
| 6,477,648 B1 | 11/2002 | Schell et al. | |
| 6,487,666 B1 | 11/2002 | Shanklin et al. | |
| 6,499,107 B1 | 12/2002 | Gleichauf et al. | |
| 6,539,381 B1 | 3/2003 | Prasad et al. | |
| 6,546,493 B1 | 4/2003 | Magdych et al. | |
| 6,587,876 B1 | 7/2003 | Mahon et al. | |
| 6,590,885 B1 | 7/2003 | Jorgensen | |
| 6,678,734 B1 | 1/2004 | Haatainen et al. | |
| 6,678,824 B1 | 1/2004 | Cannon et al. | |
| 6,684,332 B1 | 1/2004 | Douglas | |
| 6,711,127 B1 | 3/2004 | Gorman et al. | |
| 6,754,826 B1 | 6/2004 | Challenger et al. | |
| 6,766,320 B1 | 7/2004 | Wang et al. | |
| 6,772,196 B1 | 8/2004 | Kirsch et al. | |
| 6,789,202 B1 | 9/2004 | Ko et al. | |
| 6,816,973 B1 | 11/2004 | Gleichauf et al. | |
| 6,851,061 B1 | 2/2005 | Holland et al. | |
| 6,957,348 B1 | 10/2005 | Flowers et al. | |
| 6,983,323 B2 | 1/2006 | Cantrell et al. | |
| 6,993,706 B2 | 1/2006 | Cook | |
| 6,999,998 B2 | 2/2006 | Russell | |
| 7,032,114 B1 | 4/2006 | Moran | |
| 7,047,423 B1 | 5/2006 | Maloney et al. | |
| 7,054,930 B1 | 5/2006 | Cheriton | |
| 7,058,821 B1 | 6/2006 | Parekh et al. | |
| 7,065,657 B1 | 6/2006 | Moran | |
| 7,073,198 B1 | 7/2006 | Flowers et al. | |
| 7,076,803 B2 | 7/2006 | Bruton et al. | |
| 7,096,503 B1 | 8/2006 | Magdych et al. | |
| 7,113,789 B1 | 9/2006 | Boehmke | |
| 7,120,635 B2 | 10/2006 | Bhide et al. | |
| 7,133,916 B2 | 11/2006 | Schunemann | |
| 7,134,141 B2 | 11/2006 | Crosbie et al. | |
| 7,152,105 B2 | 12/2006 | McClure et al. | |
| 7,174,566 B2 | 2/2007 | Yadav | |
| 7,181,769 B1 | 2/2007 | Keanini et al. | |
| 7,231,665 B1 | 6/2007 | McArdle et al. | |
| 7,243,148 B2 | 7/2007 | Keir et al. | |
| 7,257,630 B2 | 8/2007 | Cole et al. | |
| 7,305,708 B2 | 12/2007 | Norton et al. | |
| 7,310,688 B1 | 12/2007 | Chin | |
| 7,313,695 B2 | 12/2007 | Norton et al. | |
| 7,315,801 B1 | 1/2008 | Dowd et al. | |
| 7,317,693 B1 | 1/2008 | Roesch et al. | |
| 7,346,922 B2 | 3/2008 | Miliefsky | |
| 7,350,077 B2 | 3/2008 | Meier et al. | |
| 7,363,656 B2 | 4/2008 | Weber et al. | |
| 7,365,872 B2 | 4/2008 | Lawrence et al. | |
| 7,467,202 B2 | 12/2008 | Savchuk | |
| 7,467,205 B1 | 12/2008 | Dempster et al. | |
| 7,467,410 B2 | 12/2008 | Graham et al. | |
| 7,493,388 B2 | 2/2009 | Wen et al. | |
| 7,496,662 B1 | 2/2009 | Roesch et al. | |
| 7,496,962 B2 | 2/2009 | Roelker et al. | |
| 7,519,954 B1 | 4/2009 | Beddoe et al. | |
| 7,539,681 B2 | 5/2009 | Norton et al. | |
| 7,580,370 B2 | 8/2009 | Boivie et al. | |
| 7,594,273 B2 | 9/2009 | Keanini et al. | |
| 7,596,807 B2 | 9/2009 | Ptacek et al. | |
| 7,644,275 B2 | 1/2010 | Mowers et al. | |
| 7,664,845 B2 | 2/2010 | Kurtz et al. | |
| 7,673,043 B2 | 3/2010 | Keir et al. | |
| 7,680,929 B1 | 3/2010 | Lyon | |
| 7,701,945 B2 | 4/2010 | Roesch et al. | |
| 7,716,742 B1 | 5/2010 | Roesch et al. | |
| 7,730,011 B1 | 6/2010 | Deninger et al. | |
| 7,730,175 B1 | 6/2010 | Roesch et al. | |
| 7,733,803 B2 | 6/2010 | Vogel, III et al. | |
| 7,801,980 B1 | 9/2010 | Roesch et al. | |
| 7,805,482 B2 | 9/2010 | Schiefer | |
| 7,805,762 B2 | 9/2010 | Rowland | |
| 7,831,522 B1 | 11/2010 | Satish et al. | |
| 7,885,190 B1 | 2/2011 | Roesch et al. | |
| 7,949,732 B1 | 5/2011 | Roesch et al. | |
| 8,020,211 B2 | 9/2011 | Keanini et al. | |
| 8,041,773 B2 | 10/2011 | Abu-Ghazaleh et al. | |
| 8,150,039 B2 | 4/2012 | de Cesare et al. | |
| 8,272,055 B2 | 9/2012 | Wease | |
| 8,289,882 B2 | 10/2012 | Vogel, III et al. | |
| 8,433,790 B2 | 4/2013 | Polley et al. | |
| 2001/0027485 A1 | 10/2001 | Ogishi et al. | |
| 2001/0034847 A1 | 10/2001 | Gaul, Jr. | |
| 2002/0035639 A1 | 3/2002 | Xu | |
| 2002/0066034 A1 | 5/2002 | Schlossberg | |
| 2002/0083344 A1 | 6/2002 | Vairavan | |
| 2002/0087716 A1 * | 7/2002 | Mustafa | 709/236 |
| 2002/0112185 A1 | 8/2002 | Hodges | |
| 2002/0123995 A1 | 9/2002 | Shibuya | |
| 2002/0143918 A1 | 10/2002 | Soles et al. | |
| 2002/0144142 A1 | 10/2002 | Shohat | |
| 2002/0165707 A1 | 11/2002 | Call | |
| 2002/0168082 A1 | 11/2002 | Razdan | |
| 2002/0178271 A1 | 11/2002 | Graham et al. | |
| 2003/0009699 A1 | 1/2003 | Gupta et al. | |
| 2003/0014662 A1 | 1/2003 | Gupta et al. | |
| 2003/0046388 A1 | 3/2003 | Milliken | |
| 2003/0065817 A1 | 4/2003 | Benchetrit et al. | |
| 2003/0083847 A1 | 5/2003 | Schertz et al. | |
| 2003/0093517 A1 | 5/2003 | Tarquini et al. | |
| 2003/0101353 A1 | 5/2003 | Tarquini et al. | |
| 2003/0126472 A1 | 7/2003 | Banzhof | |
| 2003/0140250 A1 | 7/2003 | Taninaka et al. | |
| 2003/0195874 A1 | 10/2003 | Akaboshi | |
| 2003/0212779 A1 | 11/2003 | Boyter et al. | |
| 2003/0212910 A1 | 11/2003 | Rowland et al. | |
| 2003/0217283 A1 | 11/2003 | Hrastar et al. | |
| 2003/0229726 A1 | 12/2003 | Daseke et al. | |
| 2004/0010684 A1 | 1/2004 | Douglas | |
| 2004/0015728 A1 | 1/2004 | Cole et al. | |
| 2004/0034773 A1 | 2/2004 | Balabine et al. | |
| 2004/0064726 A1 | 4/2004 | Girouard | |
| 2004/0073800 A1 | 4/2004 | Shah et al. | |
| 2004/0093408 A1 | 5/2004 | Hirani et al. | |
| 2004/0093582 A1 | 5/2004 | Segura | |
| 2004/0098618 A1 | 5/2004 | Kim et al. | |
| 2004/0117478 A1 | 6/2004 | Triulzi et al. | |
| 2004/0123153 A1 | 6/2004 | Wright et al. | |
| 2004/0172234 A1 | 9/2004 | Dapp et al. | |
| 2004/0179477 A1 | 9/2004 | Lincoln et al. | |
| 2004/0193943 A1 | 9/2004 | Angelino et al. | |
| 2004/0210756 A1 | 10/2004 | Mowers et al. | |
| 2004/0218532 A1 | 11/2004 | Khirman | |
| 2004/0221176 A1 | 11/2004 | Cole | |
| 2004/0250032 A1 | 12/2004 | Ji et al. | |

(56) References Cited

U.S. PATENT DOCUMENTS

| | | |
|---|---|---|
| 2004/0268358 A1 | 12/2004 | Darling et al. |
| 2005/0005169 A1 | 1/2005 | Kelekar |
| 2005/0015623 A1 | 1/2005 | Williams et al. |
| 2005/0044422 A1 | 2/2005 | Cantrell et al. |
| 2005/0055399 A1 | 3/2005 | Savchuk |
| 2005/0076066 A1 | 4/2005 | Stakutis et al. |
| 2005/0108393 A1 | 5/2005 | Banerjee et al. |
| 2005/0108554 A1 | 5/2005 | Rubin et al. |
| 2005/0108573 A1 | 5/2005 | Bennett et al. |
| 2005/0113941 A1 | 5/2005 | Ii et al. |
| 2005/0114700 A1 | 5/2005 | Barrie et al. |
| 2005/0160095 A1 | 7/2005 | Dick et al. |
| 2005/0172019 A1 | 8/2005 | Williamson et al. |
| 2005/0188079 A1 | 8/2005 | Motsinger et al. |
| 2005/0223014 A1 | 10/2005 | Sharma et al. |
| 2005/0229255 A1 | 10/2005 | Gula et al. |
| 2005/0240604 A1 | 10/2005 | Corl, Jr. et al. |
| 2005/0251500 A1 | 11/2005 | Vahalia et al. |
| 2005/0268331 A1 | 12/2005 | Le et al. |
| 2005/0268332 A1 | 12/2005 | Le et al. |
| 2005/0273673 A1 | 12/2005 | Gassoway |
| 2005/0273857 A1 | 12/2005 | Freund |
| 2006/0174337 A1 | 8/2006 | Bernoth |
| 2006/0265748 A1 | 11/2006 | Potok |
| 2006/0288053 A1 | 12/2006 | Holt et al. |
| 2006/0294588 A1 | 12/2006 | Lahann et al. |
| 2007/0027913 A1 | 2/2007 | Jensen et al. |
| 2007/0058631 A1 | 3/2007 | Mortier et al. |
| 2007/0143852 A1 | 6/2007 | Keanini et al. |
| 2007/0162463 A1 | 7/2007 | Kester et al. |
| 2007/0192286 A1 | 8/2007 | Norton et al. |
| 2007/0192863 A1 | 8/2007 | Kapoor et al. |
| 2007/0195797 A1 | 8/2007 | Patel et al. |
| 2007/0271371 A1 | 11/2007 | Singh Ahuja et al. |
| 2007/0283007 A1 | 12/2007 | Keir et al. |
| 2007/0283441 A1 | 12/2007 | Cole et al. |
| 2007/0288579 A1 | 12/2007 | Schunemann |
| 2008/0115213 A1 | 5/2008 | Bhatt et al. |
| 2008/0127342 A1 | 5/2008 | Roesch et al. |
| 2008/0133523 A1 | 6/2008 | Norton et al. |
| 2008/0168561 A1 | 7/2008 | Durie et al. |
| 2008/0196102 A1 | 8/2008 | Roesch |
| 2008/0209518 A1 | 8/2008 | Sturges et al. |
| 2008/0244741 A1 | 10/2008 | Gustafson et al. |
| 2008/0263197 A1 | 10/2008 | Stephens |
| 2008/0276319 A1 | 11/2008 | Rittermann |
| 2008/0289040 A1 | 11/2008 | Ithal |
| 2009/0019141 A1 | 1/2009 | Bush et al. |
| 2009/0028147 A1 | 1/2009 | Russell |
| 2009/0041020 A1 | 2/2009 | Gibbons et al. |
| 2009/0055691 A1 | 2/2009 | Ouksel et al. |
| 2009/0097662 A1 | 4/2009 | Olechowski et al. |
| 2009/0164517 A1 | 6/2009 | Shields et al. |
| 2009/0171981 A1 | 7/2009 | Shuster |
| 2009/0182864 A1 | 7/2009 | Khan et al. |
| 2009/0259748 A1 | 10/2009 | Mcclure et al. |
| 2009/0262659 A1 | 10/2009 | Sturges et al. |
| 2009/0271696 A1 | 10/2009 | Bailor et al. |
| 2009/0282481 A1 | 11/2009 | Dow et al. |
| 2009/0307776 A1 | 12/2009 | Curnyn |
| 2009/0320138 A1 | 12/2009 | Keanini et al. |
| 2010/0050260 A1 | 2/2010 | Nakakoji et al. |
| 2010/0077483 A1 | 3/2010 | Stolfo et al. |
| 2010/0088767 A1 | 4/2010 | Wease |
| 2010/0161795 A1 | 6/2010 | Deridder et al. |
| 2010/0205675 A1 | 8/2010 | Vogel, III et al. |
| 2010/0257267 A1 | 10/2010 | Sohn et al. |
| 2010/0268834 A1 | 10/2010 | Eidelman et al. |
| 2011/0307600 A1 | 12/2011 | Polley et al. |
| 2011/0314143 A1 | 12/2011 | Vogel, III et al. |
| 2012/0233222 A1 | 9/2012 | Roesch |

FOREIGN PATENT DOCUMENTS

| | | |
|---|---|---|
| GB | 2 432 933 A | 6/2007 |
| WO | WO 01/37511 A2 | 5/2001 |
| WO | WO 2004/100011 A1 | 11/2004 |
| WO | WO 2005/064884 A1 | 7/2005 |
| WO | WO 2006/025050 A2 | 3/2006 |
| WO | WO 2009/032925 A1 | 3/2009 |

OTHER PUBLICATIONS

Tarjan, et al., "Storing a Sparse Table," Communications of the ACM (Nov. 1979), vol. 2, No. 11, pp. 606-620.

V. Jacobson, et al., Request for Comments: 1323, "TCP Extensions for High Performance," May 1992 (35 pages).

J. Howe, "An Environment for "Sniffing" DCE-RPC Traffic," *CITI Technical Report 93-4*, Jun. 21, 1993, 12 pages total.

T. Ptacek, et al., "Insertion, Evasion, and Denial of Service: Eluding Network Intrusion Detection", Jan. 1998, pp. 1-63.

U.S. Appl. No. 10/843,374, filed May 2004, Roesch et al., System and Method For Determining Characteristics of a Network Based on Flow Analysis.

U.S. Appl. No. 12/813,859, filed Jun. 2010, Polley et al., System and Method for Assigning Network Blocks to Sensors.

U.S. Appl. No. 12/820,227, filed Jun. 2010, Vogel, III et al., System and Method for Resolving Operating System or Service Identity Conflicts.

R. Gula, "Passive Vulnerability Detection. *Techniques to passively find network security vulnerabilities*," Sep. 9, 1999 (5 pp.).

N. Chase, "Active Server Pages 3.0 from Scratch" (Dec. 1999), Searching for products section, 13 pp.

L. Spitzner, "Passive Fingerprinting," *FOCUS on Intrusion Detection: Passive Fingerprinting* (May 3, 2000), pp. 1-4; obtained from: http://www.stillhq.com/pdfdb/000183/data.pdf.

N. Brownlee, et al., "Methodology for Passive Analysis of a University Internet Link," *PAM2001 Passive and Active Measurement Workshop*, Apr. 2001 (7 pp.).

B. Krishnamurthy, "Web Protocols and Practice," (May 1, 2001), pp. 518-520.

G. Lyon, "Remote OS detection via TCP/IP Stack Fingerprinting" (Jun. 30, 2002), pp. 1-12, obtained from: http://web.archive.org/web20021017063625/www.insecure.org/nmap/nmap-fingerprinting-article.html.

U. Shankar and V. Paxson, *Active Mapping: Resisting NIDS Evasion Without Altering Traffic*, Proc. IEEE Symposium on Security and Privacy. May 2003, pp. 1-18.

D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.

R.P. Lippmann et al., "Passive Operating System Identification from TCP/IP Packet Headers," *Proceedings Workshop on Data Mining for Computer Security (DMSEC)*, Nov. 2003 (10 pp.).

Norton et al., "Multi-Patten Search Engine Aho-Corasick State Machine" (Mar. 17, 2004), Version 2.0, 36 pp.

R. Hiyoshi, "Practical Guide to Intrusion Detection System: Snort & Tripwire," Japan, Apr. 25, 2004, pp. 57-230 (concise English explanation of relevance attached).

R. Deraison, et al., "Passive Vulnerability Scanning: Introduction to NeVO," *Tenable Network Security*, May 30, 2004, pp. 1-13.

Full Band and Matrix Algorithms (Jun. 9, 2004), http://web.archive.org/web20040109154658/http://www.netlib.org/utk/Isi/pcwLSI/text/node150.html.

M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.

R. Deraison, et al., "Nessus Network Auditing," *Sungress Publishing*, Jul. 20, 2004, pp. 1-13.

Norton et al., "Sourcefire Optimizing Pattern Matching for Intrusion Detection" (Sep. 2004), 14 pp.

J. Novak, "Target-Based Fragmentation Reassembly" (Apr. 2005), Revision 2.0, pp. 1-32.

S.Siddharth, "Evading NIDS, revisited" (Dec. 12, 2005).

(56) References Cited

OTHER PUBLICATIONS

"Snort™ Users Manual 2.6.0," *The Snort Project* (May 23, 2006), pp. 1-126.

"toupper()—convert lowercase character to uppercase," http://www.mkssoftware.com, printed on Sep. 20, 2008 from http://web.archive.org, archive date Jun. 30, 2006, 2 pp.

J. Novak et al., "Target-Based TCP Stream Reassembly" (Aug. 3, 2007), Revision 1.0, pp. 1-23, obtained from: http://www.snort/org/docs/stream5-model1AUg032007.pdf.

"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.

D. Joseph, et al., "A Policy-aware Switching Layer for Data Centers," *SIGCOMM*, Aug. 17-22, 2008, pp. 51-62.

"Enhanced Operating System Identification with Nessus," *Tenable Network Security* (2007), obtained from: http://blog.tenablesecurity.com/2009/02/enhanced_operat.html, posted by R. Gula on Feb. 16, 2009 (3 pp. total).

Office Action issued by the U.S. Patent Office on Jul. 16, 2007 in connection with related U.S. Appl. No. 10/898,220.

Office Action issued by the U.S. Patent Office on Sep. 6, 2007 in connection with related U.S. Appl. No. 10/843,374.

Notice of Allowance issued by the U.S. Patent Office on Sep. 6, 2007 in connection with related U.S. Appl. No. 10/843,376.

Office Action issued by the U.S. Patent Office on Sep. 26, 2007 in connection with related U.S. Appl. No. 10/843,353.

Office Action issued by the U.S. Patent Office on Oct. 4, 2007 in connection with related U.S. Appl. No. 10/951,796.

Notice of Allowance issued by the U.S. Patent Office on Oct. 5, 2007 in connection with related U.S. Appl. No. 10/793,887.

International Search Report and Written Opinion of the International Searching Authority issued on Oct. 9, 2007 in connection with PCT application No. PCT/US06/43800, which corresponds to U.S. Appl. No. 11/272,034.

Office Action issued by the U.S. Patent Office on Nov. 21, 2007 in connection with related U.S. Appl. No. 10/843,398.

European Search Report issued by the European Patent Office on Nov. 22, 2007 in connection with European patent application No. 07014575.0-1244, which corresponds to related U.S. Appl. No. 11/493,934.

International Search Report and Written Opinion of the International Searching Authority issued on Dec. 5, 2007 in connection with PCT application No. PCT/US05/25583, which corresponds to related U.S. Appl. No. 10/951,796.

European Search Report issued by the European Patent Office on Dec. 27, 2007 in connection with European patent application No. 07015003.2-2413, which corresponds to related U.S. Appl. No. 11/501,776.

Office Action issued by the U.S. Patent Office on Jan. 10, 2008 in connection with related U.S. Appl. No. 10/843,373.

Office Action issued by the U.S. Patent Office on Feb. 5, 2008 in connection with related U.S. Appl. No. 10/843,375.

Office Action issued by the U.S. Patent Office on Feb. 21, 2008 in connection with related U.S. Appl. No. 11/272,033.

Office Action issued by the U.S. Patent Office on Mar. 12, 2008 in connection with parent U.S. Appl. No. 10/843,459.

Office Action issued by the U.S. Patent Office on Mar. 20, 2008 in connection with related U.S. Appl. No. 10/843,374.

Final Office Action issued by the U.S. Patent Office on May 9, 2008 in connection with related U.S. Appl. No. 10/843,353.

International Preliminary Report on Patentability mailed on May 22, 2008 in connection with PCT application No. PCT/US06/43800, which corresponds to U.S. Appl. No. 11/272,034.

Final Office Action issued by the U.S. Patent Office on Jun. 4, 2008 in connection with related U.S. Appl. No. 10/843,398.

International Search Report and Written Opinion of the International Searching Authority issued on Jun. 19, 2008 in connection with PCT application No. PCT/US05/25584, which corresponds to U.S. U.S. Appl. No. 10/898,220.

Final Office Action issued by the U.S. Patent Office on Jun. 26, 2008 in connection with related U.S. Appl. No. 10/898,220.

International Search Report and Written Opinion of the International Searching Authority issued on Jun. 30, 2008 in connection with PCT application No. PCT/US07/21351, which corresponds to U.S. Appl. No. 11/905,980.

International Search Report and Written Opinion of the International Searching Authority issued on Jul. 2, 2008 in connection with PCT application No. PCT/US08/02454, which corresponds to U.S. Appl. No. 11/711,876.

International Search Report and Written Opinion of the International Searching Authority issued on Jul. 7, 2008 in connection with PCT application No. PCT/US06/43820, which corresponds to U.S. Appl. No. 11/272,035.

Office Action issued by the U.S. Patent Office on Jul. 11, 2008 in connection with related U.S. Appl. No. 11/272,034.

Final Office Action issued by the U.S. Patent Office on Jul. 17, 2008 in connection with parent U.S. Appl. No. 10/843,459.

Final Office Action issued by the U.S. Patent Office on Aug. 6, 2008 in connection with related U.S. Appl. No. 10/843,375.

Notice of Allowance issued by the U.S. Patent Office on Aug. 18, 2008 in connection with related U.S. Appl. No. 11/272,033.

International Search Report and Written Opinion of the International Searching Authority issued on Aug. 18, 2008 in connection with PCT application No. PCT/US08/05466, which corresponds to U.S. Appl. No. 12/149,196.

Final Office Action issued by the U.S. Patent Office on Aug. 19, 2008 in connection with related U.S. Appl. No. 10/843,373.

Final Office Action issued by the U.S. Patent Office on Aug. 20, 2008 in connection with related U.S. Appl. No. 10/843,353.

Office Action issued by the U.S. Patent Office on Oct. 6, 2008 in connection with related U.S. Appl. No. 10/843,374.

Notice of Allowance issued by the U.S. Patent Office on Oct. 15, 2008 in connection with related U.S. Appl. No. 10/951,796.

Notice of Allowance issued by the U.S. Patent Office on Oct. 21, 2008 in connection with related U.S. Appl. No. 10/843,375.

European Office Action issued by the European Patent Office on Nov. 28, 2008 in connection with European patent application No. 07 015 003.2-2413, which corresponds to related U.S. Appl. No. 11/501,776.

Office Action issued by the U.S. Patent Office on Dec. 17, 2008 in connection with related U.S. Appl. No. 10/843,398.

Office Action issued by the U.S. Patent Office on Dec. 23, 2008 in connection with related U.S. Appl. No. 11/272,034.

Office Action issued by the U.S. Patent Office on Jan. 16, 2009 in connection with related U.S. Appl. No. 10/843,353.

Office Action issued by the U.S. Patent Office on Jan. 21, 2009 in connection with related U.S. Appl. No. 11/493,934.

Notice of Allowance issued by the U.S. Patent Office on Jan. 21, 2009 in connection with related U.S. Appl. No. 10/898,220.

Office Action issued by the U.S. Patent Office on Feb. 4, 2009 in connection with related U.S. Appl. No. 10/843,373.

Office Action issued by the U.S. Patent Office on Feb. 9, 2009 in connection with parent U.S. Appl. No. 10/843,459.

International Preliminary Report on Patentability and Written Opinion of the International Searching Authority mailed on Mar. 3, 2009 in connection with PCT application No. PCT/US05/025584, which corresponds to U.S. Appl. No. 10/898,220.

International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.

International Preliminary Report on Patentability mailed on Apr. 7, 2009 in connection with PCT application No. PCT/US07/021351, which corresponds to U.S. Appl. No. 11/905,980.

Office Action issued by the U.S. Patent Office on Apr. 28, 2009 in connection with related U.S. Appl. No. 11/501,776.

Final Office Action issued by the U.S. Patent Office on May 13, 2009 in connection with related U.S. Appl. No. 10/843,374.

Office Action issued by the U.S. Patent Office on May 14, 2009 in connection with related U.S. Appl. No. 11/272,034.

(56) References Cited

OTHER PUBLICATIONS

International Search Report and Written Opinion of the International Searching Authority mailed on May 27, 2009 in connection with PCT application No. PCT/US09/02210, which corresponds to U.S. Appl. No. 12/230,338.
Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
Office Action issued by the U.S. Patent Office on Jul. 6, 2009 in connection with parent U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Jul. 30, 2009 in connection with related U.S. Appl. No. 11/493,934.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with parent U.S. Appl. No. 10/843,459.
European Search Report issued by the European Patent Office on Oct. 12, 2009 in connection with European patent application No. 05773501.1-2201, which corresponds to related U.S. Appl Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.
Office Action issued by the U.S. Patent Office on Dec. 17, 2009 in connection with related U.S. Appl. No. 11/493,934.
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Notice of Allowance issued by the U.S. Patent Office on Feb. 5, 2010 in connection with related U.S. Appl. No. 11/272,034.
Advisory Action issued by the U.S. Patent Office on Feb. 24, 2010 in connection with related U.S. Appl. No. 11/272,035.
Notice of Allowance issued by the U.S. Patent Office on Mar. 5, 2010 in connection with related U.S. Appl. No. 11/785,609.
International Search Report and Written Opinion of the International Searching Authority issued on Mar. 16, 2010 in connection with PCT application No. PCT/US09/59965, which corresponds to U.S. Appl. No. 12/575,612.
Office Action issued by the U.S. Patent Office on Mar. 16, 2010 in connection with related U.S. Appl. No. 11/272,035.
Final Office Action issued by the U.S. Patent Office on Mar. 17, 2010 in connection with related U.S. Appl. No. 10/843,374.
Office Action issued by the U.S. Patent Office on Mar. 22, 2010 in connection with related U.S. Appl. No. 11/493,934.
Office Action issued by the U.S. Patent Office on Apr. 7, 2010 in connection with related U.S. Appl. No. 11/711,876.
Office Action issued by the U.S. Patent Office on Apr. 15, 2010 in connection with related U.S. Appl. No. 12/010,900.
Office Action issued by the U.S. Patent Office on Apr. 21, 2010 in connection with parent U.S. Appl. No. 10/843,459.
Notice of Allowance issued by the U.S. Patent Office on May 24, 2010 in connection with related U.S. Appl. No. 10/843,398.
Advisory Action issued by the U.S. Patent Office on Aug. 3, 2010 in connection with related U.S. Appl. No. 10/843,374.
Final Office Action issued by the U.S. Patent Office on Sep. 8, 2010 in connection with parent U.S. Appl. No. 10/843,459.
Final Office Action issued by the U.S. Patent Office on Sep. 17, 2010 in connection with related U.S. Appl. No. 11/711,876.
Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).
Final Office Action issued by the U.S. Patent Office on Sep. 30, 2010 in connection with related U.S. Appl. No. 11/493,934.
Notice of Allowance issued by the U.S. Patent Office on Oct. 5, 2010 in connection with related U.S. Appl. No. 10/843,374.
International Preliminary Report on Patentability mailed on Oct. 19, 2010 in connection with PCT application No. PCT/US2009/02210, which corresponds to U.S. Appl. No. 12/230,338.
Final Office Action issued by the U.S. Patent Office on Oct. 25, 2010 in connection with related U.S. Appl. No. 11/272,035.
Office Action issued by the U.S. Patent Office on Nov. 19, 2010 in connection with parent U.S. Appl. No. 10/843,459.
Final Office Action issued by the U.S. Patent Office on Nov. 24, 2010 in connection with related U.S. Appl. No. 12/010,900.
Final Office Action issued by the U.S. Patent Office on Nov. 4, 2010 in connection with parent U.S. Appl. No. 10/843,459.
Office Action issued by the U.S. Patent Office on Dec. 22, 2010 in connection with related U.S. Appl. No. 11/905,980.
"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010] (XP002610157).
V. Yegneswaran, et al., "Internet Sieve: An Architecture for Generating Resilient Signatures," May 2004, Retrieved from the Internet: URL:http://www.cc.gatech.edu/~giffin/papers/tr1507/tr1507.pdf [retrieved on Nov. 18, 2010] (XP002610154).
D. Roekler, "Http IDS Evasions Revisited," Jan. 8, 2003, Retrieved from the Internet: URL:http://docs.idsresearch.org/http_ids_evasions.pdf [Nov. 18, 2010] (XP002610155).
M. Norton, et al., "The New Snort," *Computer Security Journal*, CSI Security Institute, XIX, No. 3 (Jan. 1, 2003), pp. 37-47, ISSN: 0277-0865 (XP008039475).
European Search Report issued by the European Patent Office on Dec. 6, 2010 in connection with European patent application No. 05773540.9-2413, which corresponds to related U.S. Patent No. 7,496,962.
Notice of Allowance issued by the U.S. Patent Office on Jan. 24, 2011 in connection with parent U.S. Appl. No. 10/843,459.
Notice of Allowance issued by the U.S. Patent Office on Feb. 24, 2011 in connection with related U.S. Appl. No. 11/493,934.
Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx , Dec. 1, 2009.
Office Action mailed Mar. 1, 2011 from the Japan Patent Office for Japanese patent application No. 2007-523640 in connection with related U.S. Appl. No. 10/898,220, now U.S. patent No. 7,539,681, U.S. Appl. No. 11/785,609, now U.S. patent No. 7,756,885, and U.S. Appl. No. 12/010,900 (English translation enclosed).
Office Action issued by the U.S. Patent Office on Apr. 6, 2011 in connection with related U.S. Appl. No. 11/711,876.
Office Action issued by the U.S. Patent Office on Apr. 13, 2011 in connection with related U.S. Appl. No. 12/230,338.
Office Action issued by the U.S. Patent Office on May 12, 2011 in connection with related U.S. Appl. No. 12/149,196.

(56) References Cited

OTHER PUBLICATIONS

U.S. Appl. No. 13/046,127, filed Mar. 11, 2011, Roesch.
U.S. Appl. No. 13/086,819, filed Apr. 14, 2011, Olney et al.
Notice of Allowance issued by the U.S. Patent Office on Apr. 6, 2011 in connection with related U.S. Appl. No. 12/010,900.
PCT International Preliminary Report on Patentability mailed on Apr. 21, 2011 by the International Bureau of WIPO in connection with PCT patent application No. PCT/US2009/059965, which corresponds to U.S. Appl. No. 12/575,612.
Office Action issued by the U.S. Patent Office on May 31, 2011 in connection with related U.S. Appl. No. 12/688,400.
Notice of Allowance issued by the U.S. Patent Office on Jun. 22, 2011 in connection with related U.S. Appl. No. 11/272,035.
Notice of Allowance issued by the U.S. Patent Office on Jul. 22, 2011 in connection with related U.S. Appl. No. 11/711,876.
Extended European Search Report issued by the European Patent Office on Jul. 19, 2011 in connection with European patent application No. 06837333.1-2413, which corresponds to related U.S. Patent No. 7,733,803.
International Search Report and Written Opinion of the International Searching Authority issued on Jul. 28, 2011 in connection with PCT application No. PCT/US2011/032489, which corresponds to U.S. Appl. No. 13/086,819.
Matthew Olney et al.: "What would you do with a pointer and a size? A New Detection Framework", Apr. 22, 2010, XP55002567, http://labs.snort.org/nrt/sfvrt-nrt.pdf (retrieved on Jul. 12, 2010), XP55002567, http://labs.snort.org.nrt/sfvrt-nrt.pdf (retrieved on Jul. 12, 2011) the whole document.
International Search Report and Written Opinion of the International Searching Authority issued on Sep. 1, 2011 in connection with PCT application No. PCT/US2011/035874, which corresponds to U.S. Appl. No. 12/820,227.
Francois Gagnon et al.: "A Hybrid Approach to Operating System Discovery using Answer Set Programming", Integrated Network Management, 2007. IM'07, 10$^{TH}$ IFIP/IEEE International Symposium on, IEEE, PI, May 1, 2007, pp. 391-400, XP031182713, ISBN: 978-1-4244-0798-9, p. 293, 394-397.
Final Office Action issued by the U.S. Patent Office on Sep. 14, 2011 in connection with related U.S. Appl. No. 12/230,338.
Notice of Allowance issued by the Japanese Patent Office on Sep. 30, 2011 in connection with Japanese Patent Application No. 2007-523640, which corresponds to related U.S. Appl. No. 10/898,220, now U.S. Patent No. 7,539,681.
Notice of Allowance issued the by U.S. Patent Office on Oct. 28, 2011 in connection with related U.S. Appl. No. 12/149,196.
Advisory Action issued by the U.S. Patent Office on Nov. 28, 2011 in connection with related U.S. Appl. No. 12/230,338.
Final Office Action issued by the U.S. Patent Office on Dec. 9, 2011 in connection with related U.S. Appl. No. 12/688,400.
Office Action issued by the U.S. Patent Office on Feb. 2, 2012 in connection with related U.S. Appl. No. 12/688,400.
Office Action issued by the U.S. Patent Office on Feb. 15, 2012 in connection with related U.S. Appl. No. 12/820,227.
Office Action issued by the U.S. Patent Office on Feb. 15, 2012 in connection with related U.S. Appl. No. 12/230,338.
Office Action issued by the U.S. Patent Office on Mar. 19, 2012 in connection with related U.S. Appl. No. 12/813,859.
International Search Report and Written Opinion of the International Searching Authority issued on Apr. 25, 2012 in connection with PCT application No. PCT/US2012/021633, which corresponds to U.S. Appl. No. 13/046,127.

Final Office Action issued by the U.S. Patent Office on May 29, 2012 in connection with related U.S. Appl. No. 12/230,338.
Notice of Allowance issued by the U.S. Patent Office on May 30, 2012 in connection with related U.S. Appl. No. 12/575,612.
Final Office Action issued by the U.S. Patent Office on Jun. 5, 2012 in connection with related U.S. Appl. No. 12/813,859.
Notice of Allowance issued by the U.S. Patent Office on Jun. 25, 2012 in connection with related U.S. Appl. No. 12/688,400.
International Preliminary Report on Patentability mailed by the International Bureau of WIPO on Jan. 10, 2013, in connection with corresponding PCT international application No. PCT/US2011/035874, which corresponds to related U.S. Appl. No. 12/820,227.
Office Action issued by the U.S. Patent Office on Feb. 8, 2013 in connection with related U.S. Appl. No. 13/046,127.
Notice of Allowance issued by the U.S. Patent Office on Mar. 14, 2013 in connection with related U.S. Appl. No. 12/230,338.
U.S. Appl. No. 13/779,851, filed Feb. 28, 2013, Polley et al.
Office Action issued by the U.S. Patent Office on Oct. 15, 2012 in connection with related U.S. Appl. No. 12/230,338.
International Preliminary Report on Patentability mailed by the International Bureau of WIPO on Oct. 26, 2012, in connection with corresponding PCT application No. PCT/US2011/032489, which corresponds to related U.S. Appl. No. 13/086,819.
Office Action issued by the U.S. Patent Office on Nov. 6, 2012 in connection with related U.S. Appl. No. 12/820,227.
Li, Zhichun, et al. Netshield: Matching with a large vulnerability signature ruleset for high performance network defense. Technical Report NWU-EECS-08-07, Northwestern University, Aug. 2010.
Notice of Allowance issued by the U.S. Patent Office on Jan. 9, 2013 in connection with related U.S. Appl. No. 12/813,859.
Auffret, Patrice. "SinFP, unification of active and passive operating system fingerprinting." Journal in Computer Virology 6.3 (2010): 197-205.
De Montigny-Leboef, Annie. "A multi-packet signature approach to passive operating system detection." Defense Technical Information Center, 2005.
Tu, William, et al. "Automated Service Discovery for Enterprise Network Management." Mar. 8, 2009.
Taleck, Greg. "Ambiguity Resolution via Passive OS Fingerprinting." Recent Advances in Intrusion Detection. Springer-Verlag Berlin Heidelberg, 2003.
Martin Roesch, "Snort-Lightweight Intrusion Detection for Networks", Proceedings of LISA '99: 13$^{th}$ System Administration Conference, Nov. 12, 1999, pp. 229-238, http://citeseerx.ist.psu.edu/viewdoc/summary?doi=10.1.1.105.6212.
Office Action issued by the European Patent Office on Mar. 20, 2013 in connection with European Patent Application No. 05773501.1-1952 which corresponds to related U.S. Appl. No. 10/898,220 (now patent No. 7,539,631).
Notice of Allowance issued by the Canadian Intellectual Property Office on Apr. 19, 2013 in connection with Canada Patent Application No. 2685292, which corresponds to related U.S. Appl. No. 12/820,227.
Office Action issued by the U.S. Patent Office on May 6, 2013 in connection with related U.S. Appl. No. 12/820,227.
Office Action issued by the U.S. Patent Office on May 8, 2013 in connection with related U.S. Appl. No. 13/086,819.
Final Office Action issued by the U.S. Patent Office on Jun. 10, 2013 in connection with related U.S. Appl. No. 13/046,127.

* cited by examiner

```
04/09-10:26:38.963207 10.1.1.51:49778 -> 10.1.1.4:23
TCP TTL:64 TOS:0x10 ID:56353 IpLen:20 DgmLen:60 DF
******S* Seq: 0x4DDB2782  Ack: 0x0  Win: 0x8000  TcpLen: 40
TCP Options (6) => MSS: 1460 NOP WS: 0 NOP NOP TS: 247009412 0

04/09-10:26:38.963534 10.1.1.4.23 -> 10.1.1.51:49778
TCP TTL:64 TOS:0x0 ID:815 IpLen:20 DgmLen:44 DF
***A**S* Seq: 0x752B739B  Ack: 0x4DDB2783  Win: 4470  TcpLen: 24
TCP Options  (1)  => MSS: 1460
```

FIG. 3

```
TCP Client (SYN), Server (SYN-ACK)
# Window size
# Maximum segment size
# df bit
# TCP options list
# TCP Window scale
# IP Id trend (0, +n, random)
# ttl
# Vendor
# Product name
Version server
{
        [5792,5840], X, 1, [2,4,8,3], 0, 0, 64, Linux, Linux, 2.4
        8760-10154, SYN, 1, [8,3,4,2], 0, +1, 255, Sun, SunOS, 5.7 SPARC
        8192-9520, X, 1, 2, -1, +256, 128, Microsoft, Windows, NT
} client
{
        24616-25992, X, 1, [4,2], -1, +1, 64, Sun, SunOS, 5.8 SPARC
        61440, X, 0, 2, -1, +1, 60, SGI, Irix, "6.3, 6.5"
        64240-65535, X, 1, [2,3,4], 0, +1, 128, Microsoft, Windows, "2000Pro
SP3, 2000Pro SP4, XP SP1"
}

SMB Application Fingerprint
# OS Major
# OS Minor
# Flags
# Vendor
# Product Name
Version {
        4, 0, 4096, Microsoft, Windows, NT
        5, 1, 4096, Microsoft, Windows, XP
        4, 0, 0, Microsoft, Windows, "98, ME"
}
```

FIG. 8

SYSTEMS AND METHODS FOR DETERMINING CHARACTERISTICS OF A NETWORK AND ENFORCING POLICY

CROSS-REFERENCE TO RELATED APPLICATIONS

This application is a continuation of U.S. patent application Ser. No. 10/843,459 filed May 12, 2004, now U.S. Pat. No. 7,949,732, titled "SYSTEMS AND METHODS FOR DETERMINING CHARACTERISTICS OF A NETWORK AND ENFORCING POLICY," and claims the benefit of U.S. Provisional Patent Application Ser. No. 60/469,395 filed May 12, 2003, which are herein incorporated by reference in their entirety.

BACKGROUND OF THE INVENTION

1. Field of the Invention

Embodiments of the present invention relate to systems and methods for determining the characteristics of a computer network. More particularly, embodiments of the present invention relate to systems and methods for automatically and passively determining a host configuration of a computer network.

2. Background Information

Computers and computer networks connecting such computers are vital components of modern society. Unfortunately, such computer networks are susceptible to attacks from internal and external hostile sources. Intrusion detection systems (IDSs) are used to prevent such attacks. Conventional IDSs operate by analyzing network traffic in terms of the traffic itself. They do not, however, consider the end points of that traffic. End points refer to the originators and recipients of message traffic. Such end points include, for example, clients and the servers. Analysis of end points can provide contextual information about the network such as host addresses and services. By not considering these end points, a vital piece of contextual information about the network is missed. Consequently, a substantial need exists for technologies that provide information about the end points of computer network traffic.

IDSs are less effective than they could be because they do not have contextual information about the computer network they are monitoring. For example, without contextual information, IDSs are susceptible to a computer network attack known as evasion. Evasion occurs when an attacker uses network endpoint information that the IDS does not have, to evade detection by the IDS.

A known method of evasion is insertion. Insertion can be used in networks having a routing infrastructure that handles packets of different sizes. For example, a routing link (router or some other device) may be attached to a network that supports a 1500 byte maximum size on one side of the device and 500 bytes on the other. If someone was trying to talk to a host on the other side of the device, the maximum packet size they could send is 500 bytes. This maximum is called the "Path MTU" (Maximum Transfer Unit). If an attacker knows this, they can transmit a large packet between two properly sized packets and get the IDS to accept the oversized packet, giving the IDS a bad model of the data that is actually arriving at the host.

Not only does the lack of contextual information make the IDS more susceptible to attack, but it also makes the IDS less efficient. One such inefficiency is that, without contextual information, the IDS may not be able to discern whether or not an attack will cause harm. Attacks can be directed to a particular service running on a target host. Without information about the services running on the target host, an IDS could mistakenly detect an attack even if that host is not running the targeted service. That is, the IDS would cause an alarm even though the attack would be harmless. Such an event is called a false positive. Large numbers of false positives can make it more difficult and expensive to locate genuine attacks that can harm a host on the network.

Some conventional techniques for providing contextual information to IDSs are known. One such technique is for a human to audit each host manually and gather all desired contextual information. This manual method has a number of disadvantages including that it is time consuming, prone to error, and makes maintenance more difficult. One reason for these drawbacks is that networks are dynamic in nature. Host computers in computer networks are added, removed, and reconfigured. If these changes are not meticulously documented, each computer on the network must be revisited periodically to insure that the contextual information is up to date.

Another conventional technique for providing contextual information to an IDS is an automatic discovery system. Conventional automatic discovery systems are active scanning systems that actively probe end hosts on a computer network and perform stimulus response tests on them to find and record vulnerabilities that exist on end hosts. Though not manual, active scanning systems also suffer from several problems. One problem is that active scanning can be destructive to the network. In testing for vulnerabilities, they can cause both routers and servers to malfunction or stop functioning. Another problem is that they may not provide information useful to an IDS because in many instances a one-to-one mapping does not exist between the information an active scanner provides and the information an IDS can use. Another problem is that active scanners only provide a snapshot of the network at the time when the scan is performed. This snapshot is problematic because a host may run a vulnerable service transiently. In such a case, the active scanning may be performed at a time when the vulnerable service is not running. As a result, the active scan would not cause an alarm despite the transient nature of the vulnerability.

In view of the foregoing, it can be appreciated that a substantial need exists for systems and methods that can advantageously automatically and passively determine a host configuration of a computer network.

BRIEF SUMMARY OF THE INVENTION

One embodiment of the present invention is a method for automatically and passively determining the characteristics of a network. One or more packets transmitted on the network are read. A network device on the network is identified using the one or more packets. The identity of the network device is recorded. In a preferred embodiment of the present invention, the operating system of the network device and one or more services running on the device are identified from one or more packets and are recorded. In another embodiment of the present invention, the recorded information is reported to an IDS or a network management system (NMS).

Another embodiment of the present invention is a method for identifying a network device's operating system on a network. A packet transmitted on the network is read. The packet is decoded into one or more fields. The one or more fields are compared to an operating system identifying data structure. Any matched operating system is recorded.

Another embodiment of the present invention is a system for automatically and passively determining the characteristics of a network. The system includes a packet detector, a packet decoder, a protocol field analyzer, and a network device database. The packet detector detects and reads one or more packets transmitted on the network by a network device. The packet decoder decodes the one or more packets into one or more protocol fields. The protocol field analyzer determines information about the network device using the one or more protocol fields. The network device database receives and stores the information about the network device.

Another embodiment of the present invention is a method for identifying a router on a network from two packets identifying primary media access control addresses and a third packet identifying a secondary media access control address. A first packet transmitted on the network is read. The first packet is decoded into a first plurality of protocol fields. Either the address resolution protocol or the dynamic host configuration protocol is identified from the first plurality of protocol fields. A first Internet protocol address and a first primary media access control address are identified from the address resolution protocol or the dynamic host configuration protocol. A second packet transmitted on the network is read. The second packet is decoded into a second plurality of protocol fields. Either the address resolution protocol or the dynamic host configuration protocol is identified from the second plurality of protocol fields. A second Internet protocol address and a second primary media access control address are identified from the address resolution protocol or the dynamic host configuration protocol. A third packet transmitted on the network is read. The third packet is decoded into a third plurality of protocol fields. An Internet protocol address and a media access control address are identified from the third plurality of protocol fields. If the Internet protocol address is the second Internet protocol address and the media access control address is the first primary media access control address, then an initiator of the first packet is identified as the router.

Another embodiment of the present invention is a method for identifying a router on a network from one packet identifying a primary media access control address and a second packet identifying a network device at least one hop away. A first packet transmitted on the network is read. The first packet is decoded into a first plurality of protocol fields. Either the address resolution protocol or the dynamic host configuration protocol is identified from the first plurality of protocol fields. A first Internet protocol address and a first primary media access control address are identified from the address resolution protocol or the dynamic host configuration protocol. A second packet transmitted on the network is read. The second packet is decoded into a second plurality of protocol fields. An Internet protocol address and a media access control address are identified from the second plurality of protocol fields, where the Internet protocol address is not the same as the first Internet protocol address and the media access control address is the same as the first primary media access control address. The number of hops traveled by the second packet is determined from the second plurality of protocol fields. If the number of hops is not equal to zero, then the initiator of the first packet is identified as the router.

Another embodiment of the present invention is a method for identifying a subnet on a network. A first packet transmitted on the network is read. The first packet is decoded into a first plurality of protocol fields. Either the address resolution protocol or the dynamic host configuration protocol is identified from the first plurality of protocol fields. A first Internet protocol address and a first primary media access control address are identified from the address resolution protocol or the dynamic host configuration protocol. A second packet transmitted on the network is read. The second packet is decoded into a second plurality of protocol fields. Either the address resolution protocol or the dynamic host configuration protocol is identified from the second plurality of protocol fields. A second Internet protocol address and a second primary media access control address are identified from the address resolution protocol or the dynamic host configuration protocol. A third packet transmitted on the network is read. The third packet is decoded into a third plurality of protocol fields. A source Internet protocol address, a source media access control address, a destination Internet protocol address, and a destination media access control address are identified from the third plurality of protocol fields. If the source Internet protocol address is the same as the first Internet protocol address, the source media access control address is the same as the first primary media access control address, the destination Internet protocol address is the same as the second Internet protocol address, and the destination media access control address is the same as the second primary media access control address, then a network encompassing an initiator of the first packet and an initiator of the second packet is identified as a subnet.

Another embodiment of the present invention is a method for determining the distance between a first subnet and a second subnet on a network. A network device with a network device Internet protocol address, a network device primary media access control address, and a network device time-to-live value is identified on the first subnet. A router with a router Internet protocol address and a router primary media access control address is identified on the second subnet. A packet transmitted on the network is read. The packet is decoded into a plurality of protocol fields. A source Internet protocol address, a source media access control address, a destination Internet protocol address, and a packet time-to-live value are identified from the plurality of protocol fields. If the source Internet protocol address is the same as the network device Internet protocol address, the source media access control address is the same as the router primary media access control address, and the destination Internet protocol address is within an address space of the second subnet, then the distance between the two subnets is the difference between the network device time-to-live value and the packet time-to-live value.

Another embodiment of the present invention is a method for creating an inferred subnet on a network. A router with a router Internet protocol address and a router primary media access control address is identified on a known subnet. A packet transmitted on the network is read. The packet is decoded into a plurality of protocol fields. A source Internet protocol address, a source media access control address, and a destination Internet protocol address are identified from the plurality of protocol fields. If the address space of the known subnet does not encompass the source Internet protocol address, the source media access control address is the same as the router primary media access control address, and the destination Internet protocol address is within an address space of the known subnet, then the inferred subnet is created and the source Internet protocol address is added to the inferred subnet.

Another embodiment of the present invention is a method for identifying a service running on a network device from a packet. A packet transmitted by the network device on the network is read. The packet is decoded into one or more protocol fields. The one or more fields are compared to a service identifying data structure. A matched service is recorded as the service running on the network device.

Another embodiment of the present invention is a method for identifying a service running on a network device from two or more packets. A flow between an initiator network device and a responder network device is identified by reading, decoding, and analyzing two or more packets transmitted on the network. One or more packets of the flow are identified as one or more initiator packets. One or more packets of the flow are identified as one or more responder packets. If protocol fields of the one or more initiator packets match initiator protocol fields of the service and if protocol fields of the one or more responder packets match responder protocol fields of the service, then a service is identified as running on either the initiator network device or the responder network device.

Another embodiment of the present invention is a method for identifying a service running on a network device by comparing protocol fields of one or more packets from a flow to a service identifying data structure. A service identifying data structure is maintained that identifies one or more protocol fields for one or more services. A flow between an initiator network device and responder network device is identified by reading, decoding, and analyzing two or more packets transmitted on the network. One or more protocol fields of one or more packets of the flow are compared to one or more protocol fields of one or more services of the service identifying data structure. A matching service is recorded for either the initiator network device or the responder network device.

Another embodiment of the present invention is a method for identifying transmission control protocol flow on a network. A first packet transmitted on the network is read. The first packet is decoded into a first plurality of protocol fields. A first source Internet protocol address, a first destination Internet protocol address, a first transport protocol, a first source port, a first destination port, and a first synchronization bit are identified from the first plurality of protocol fields. The first source Internet protocol address, the first destination Internet protocol address, the first transport protocol, the first source port, and the first destination port are the first five-tuple. A second packet transmitted on the network is read. The second packet is decoded into a second plurality of protocol fields. A second source Internet protocol address, a second destination Internet protocol address, a second transport protocol, a second source port, a second destination port, a second acknowledged bit, and a second synchronization bit are identified from the second plurality of protocol fields. The second source Internet protocol address, the second destination Internet protocol address, the second transport protocol, the second source port, and the second destination port are the second five-tuple. If the first transport protocol is transmission control protocol, the second transport protocol is transmission control protocol, the first synchronization bit is set, the second synchronization bit is set, the second acknowledge bit is set, the first source Internet protocol address is the same as the second destination Internet protocol address, the second source Internet protocol address is the same as the first destination Internet protocol address, the first source port is the same as the second destination port, and the second source port is the same as the first destination port, then a third packet that corresponds to either the first five-tuple or the second 5-tuple is identified as part of the flow.

Another embodiment of the present invention is a method for identifying user datagram protocol flow on a network. A first packet transmitted on the network is read. The first packet is decoded into a first plurality of protocol fields. A first source Internet protocol address, a first destination Internet protocol address, a first transport protocol, a first source port, and a first destination port are identified from the first plurality of protocol fields. The first source Internet protocol address, the first destination Internet protocol address, the first transport protocol, the first source port, and the first destination port are the first five-tuple. A second packet transmitted on the network is read. The second packet is decoded into a second plurality of protocol fields. A second source Internet protocol address, a second destination Internet protocol address, a second transport protocol, a second source port, and a second destination port are identified from the second plurality of protocol fields. The second source Internet protocol address, the second destination Internet protocol address, the second transport protocol, the second source port, and the second destination port are the second five-tuple. If the first transport protocol is user datagram protocol, the second transport protocol is user datagram protocol, the first source Internet protocol address is the same as the second destination Internet protocol address, the second source Internet protocol address is the same as the first destination Internet protocol address, the first source port is the same as the second destination port, and the second source port is the same as the first destination port, then a third packet that corresponds to either the first five-tuple or the second five-tuple is identified as part of the flow.

Another embodiment of the present invention is a method for selecting an operating system of a network device from the results of two or more operating system identification techniques used in a passive network detection system. Two or more operating system identification techniques are employed to create two or more operating system results. Each of the two or more operating system results is assigned a confidence value. The confidence values of the two or more operating system results are compared. A result with a highest confidence value is selected as the operating system of the network device.

Another embodiment of the present invention is a method for selecting a service of a network device from the results of two or more service identification techniques used in a passive network detection system. Two or more service identification techniques are employed to create two or more service results. Each of the two or more service results is assigned a confidence value. The confidence values of the two or more service results are compared. A result with a highest confidence value is selected as the service of the network device.

Another embodiment of the present invention is a method for determining the confidence value of a result of an operating system or a service by considering previous results obtained by more than one identification technique used in a passive network detection system. A result is identified from a first one or more packets by an identifying technique. If the result is equivalent to a previous result, a confirming increment value is added to the confidence value of the previous result to produce a confidence value of the result. The confirming increment value is calculated as one half the absolute value of the difference between the confidence value of the previous result and the confidence value of the result. If the result is not equivalent to a previous result, a detracting increment value is calculated as one half of the confirming increment value and the detracting increment value is subtracted from the confidence value of the previous result to produce the confidence value of the result. A subsequent result is identified from a second one or more packets by another identifying technique. If the subsequent result is equivalent to the result, the confirming increment value is calculated as one half an absolute value of a difference between the confidence value of the previous result and the confidence value of the result and the confirming increment value is added to the confidence value of the result to produce a confidence value of the subsequent result. If the subsequent result is not equivalent to the result and the result is not equivalent to a previous result, the detracting increment value is doubled and the detracting increment value is subtracted from the confidence value of the result to produce the confidence value of the subsequent result. If the subsequent result is not equivalent to the result and the result is equivalent to a previous result, the detracting increment value is calculated as one half of the confirming increment value and the detracting increment value is subtracted from the confidence value of the result to produce the confidence value of the subsequent result.

Another embodiment of the present invention is a method for assigning a vulnerability to a network device on a network based on the operating system the network device is using. A vulnerability of an operating system is predefined. The operating system the network device is using is determined by reading, decoding, and analyzing a packet transmitted on the network. The vulnerability of the operating system the network device is using is assigned to the network device.

Another embodiment of the present invention is a method for assigning a vulnerability to a network device on a network based on the service running on the network device. A vulnerability of a service is predefined. The service the network device is running is determined by reading, decoding, and analyzing a packet transmitted on the network. The vulnerability of the service the network device is running is assigned to the network device.

Another embodiment of the present invention is a method for creating a normalized vulnerabilities database for use in a passive network detection system. A list of predefined vulnerabilities is gathered, where each vulnerability has at least one operating system name or service name. One or more operating system groups are created from the list, where each of the operating system groups has one or more vulnerabilities that list one or more operating system names that identify a unique operating system. A single operating system identifier is assigned to the each operating system group. Lookup is provide from the passive network detection system to the operating system groups by the single operating system identifier. One or more service groups are created from the list of vulnerabilities, where each of the service groups has one or more vulnerabilities that have one or more service names that identify a unique service. A single service identifier is assigned to each of the service groups. Lookup is provided from the passive network detection system to the each of the service groups by the single service identifier.

Another embodiment of the present invention is a method for enforcing a network configuration and usage policy based on an operating system using a passive network detection system. The network configuration and usage policy for an operating system is predefined. The operating system used by the network device on the network is determined by reading, decoding, and analyzing a packet transmitted on the network. An action identified by the network configuration and usage policy for the operating system is performed.

Another embodiment of the present invention is a method for enforcing a network configuration and usage policy based on a service using a passive network detection system. The network configuration and usage policy for a service is predefined. The service running on the network device on the network is determined by reading, decoding, and analyzing a packet transmitted on the network. An action identified by the network configuration and usage policy for the service is performed.

Another embodiment of the present invention is a passive network detection system that includes a packet reader, a packet decoder, a flow analyzer, an operating system detector, a service detector, a network change monitor, a host representation monitor, a normalized vulnerability list, a host representation storage, a flow analysis data storage, a policy component, a network topology component, a mapping component, and a results reporter.

BRIEF DESCRIPTION OF THE DRAWINGS

FIG. 3 shows portions of two exemplary packets that can be decoded, in accordance with an embodiment of the present invention.

FIG. 8 shows an exemplary fingerprint database entry, in accordance with an embodiment of the present invention.

Figure 1:
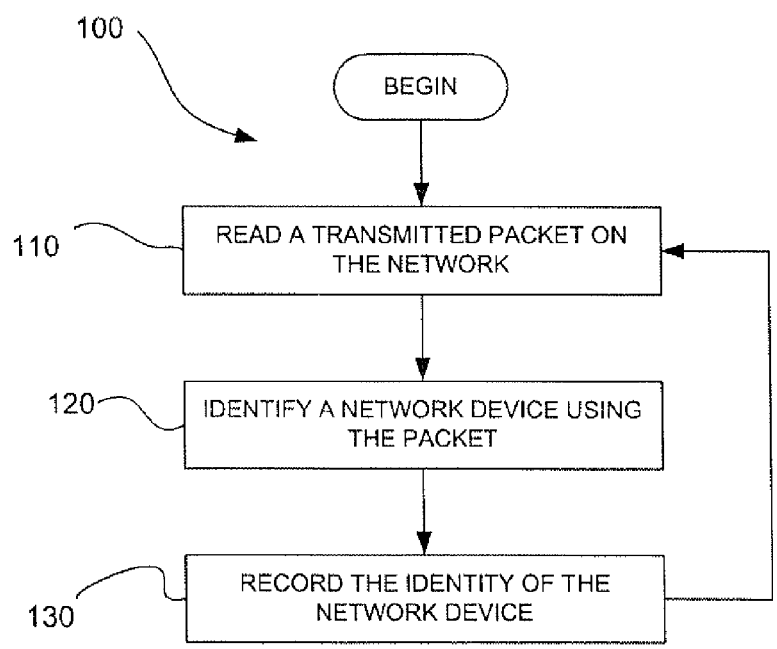
FIG. 1 is a flowchart showing a method for automatically and passively determining the characteristics of a network in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Embodiments of systems and methods for automatically and passively determining the characteristics of a network are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

Embodiments of the present invention are automatic, passive network discovery systems. These systems are passive because they examine packets moving across a network; they do not perform active scans. They are automatic because they require little or no human intervention. Embodiments of the present invention operate by performing functions including: (1) identifying each network device on a network; (2) identifying operating system and services running on each network device (preferably, with some level of assurance); (3) recording, in real-time, any changes occurring on the network; and (4) gathering this information in a format that can be used by a network reporting mechanism. Exemplary network reporting mechanisms include IDSs and NMSs.

Embodiments of the present invention examine each packet moving across a network in real-time, for characteristic information about the network. One such type of characteristic information is information related to a network device, or host, on the network. One skilled in the art will appreciate that a network device is any device with a network connection. Network devices include but are not limited to computers, printers, switches, game machines, and routers.

FIG. 1 is a flowchart showing a method 100 for automatically and passively determining the characteristics of a network in accordance with an embodiment of the present invention.

In step 110 of method 100, a packet transmitted on a network is read.

In step 120, a network device is identified using the packet. A network device includes but is not limited to a computer, a printer, and a router. One skilled in the art will appreciate that a network device can also be referred to as a host.

In step 130, the identity of the network device is recorded. The identity is stored as a data structure in a file or database, for example. If a packet identifies a network device that has previously been recorded, the current information and the previous information are compared and any changes are recorded. If no changes have been found, no new information is recorded. In either case, method 100 returns to step 110 to read the next packet.

Figure 2:
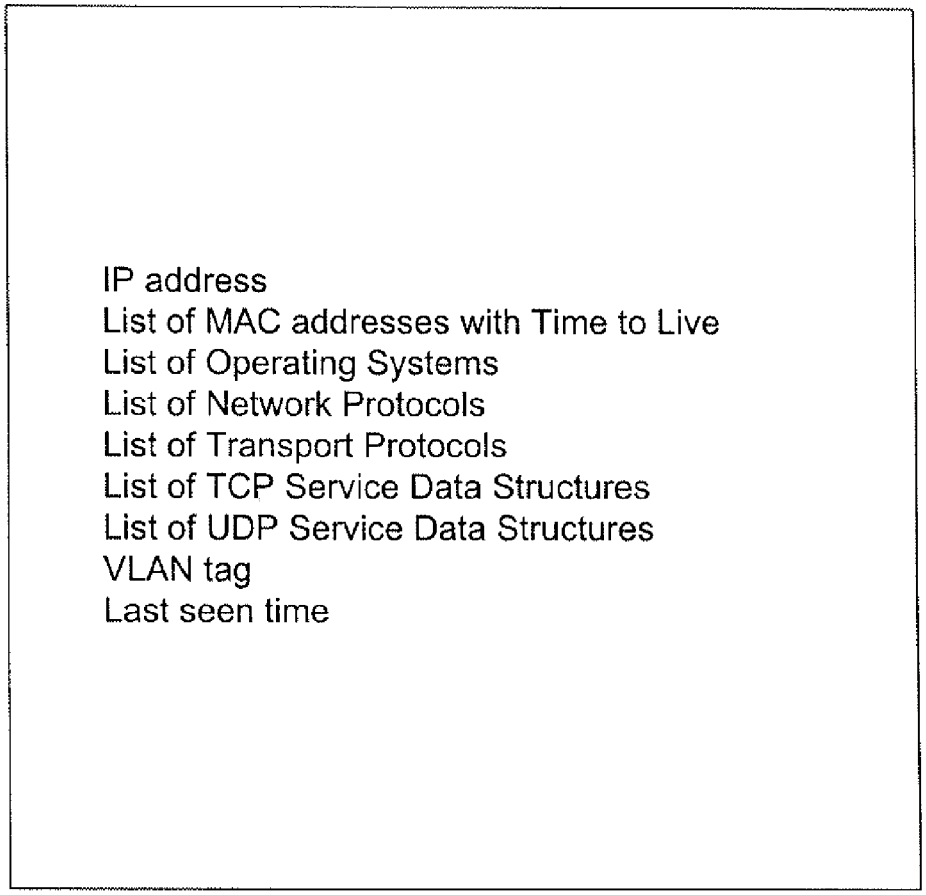
FIG. 2 is an exemplary data structure used to store host information, in accordance with an embodiment of the present invention.

FIG. 2 is an exemplary data structure used to store network device information, or host information, in accordance with an embodiment of the present invention. This data structure is the host representative data structure. In one embodiment of the present invention, host information includes the initiator Internet protocol (IP) address, a list of media access control (MAC) addresses with a time-to-live (TTL) parameter for each MAC address, a list of operating systems, a list of network protocols, a list of transport protocols, a list of transmission control protocol (TCP) service data structures, a list of user datagram protocol (UDP) service data structures, a virtual local area network (VLAN) tag, and a last seen time. The IP address, MAC address and TTL parameter of at least one network device on the network are typically included in each packet transmitted on the network. As a result, these pieces of host information are obtained by directly parsing the network and transport protocol fields of each packet.

For example, FIG. 3 shows portins of two exemplary packets that can be decoded, in accordance with an embodiment of the present invention. The initiator IP address and TTL parameter are obtained directly from the IP section. The MAC address (not shown) can be obtained directly by parsing another section of the packet. As shown in the first exemplary packet, the initiator IP address is 10.1.1.51, and the TTL parameter is 64. As shown in the second exemplary packet, the initiator IP address is 10.1.1.4, and the TTL parameter is 64.

In another embodiment, host information can be used to detect changes that have occurred in the network. For example, by comparing IP addresses and MAC addresses over time, it can be determined if IP addresses have been reassigned.

In another embodiment, host information can also be used to detect and respond to network attacks. For example, the TTL portion of the host identification information corresponds to the number of routing points between the computer generating the packet and the system detecting the packet to extract the host identification information. Some insertion attacks rely on the IDS not knowing its logical location (i.e., the number of routing points between the IDS and the target machine) with respect to a target machine. Thus, an IDS can analyze the TTL portion of the host information and provide an attack alarm if the TTL portion is outside a predefined bound.

Other host information is also useful in determining the characteristics of a network. One such piece of host information is the operating system of each host. The operating system is not transmitted in a packet and therefore cannot be obtained directly from the packet. Embodiments of the present invention obtain the operating system of a host machine by comparing decoded packet fields to elements of predefined operating system identifying data structures. One or more elements of an operating system identifying data structure that identify an operating system are referred to as a "fingerprint." An operating system identifying data structure is referred to as a "fingerprint table." The process of comparing decoded packets to elements of a fingerprint table is referred to as "fingerprinting."

Figure 4:
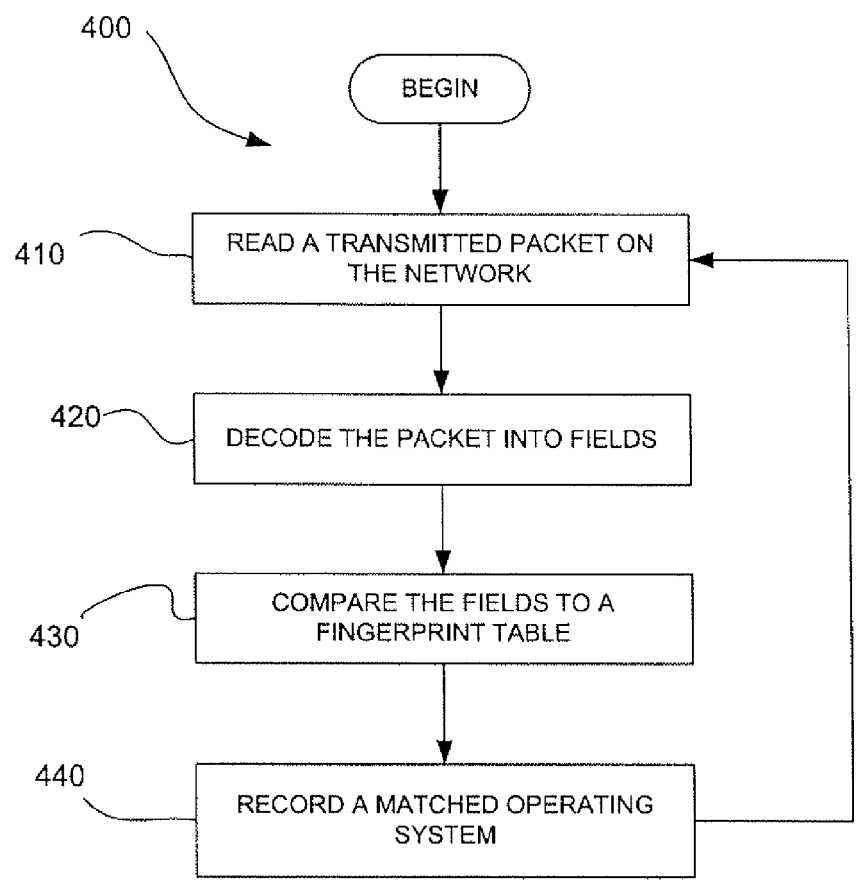
FIG. 4 is a flowchart showing a method for fingerprinting, in accordance with an embodiment of the present invention.

FIG. 4 is a flowchart showing a method 400 for fingerprinting, in accordance with an embodiment of the present invention.

In step 410 of method 400, a packet transmitted on the network is read.

In step 420, the packet is decoded into fields. A host representative data structure is created and populated with one or more of the decoded fields.

In step 430, the decoded fields are compared to a fingerprint table.

In step 440, a matched operating system is recorded. The matched operating system is added to the host representative data structure. In another embodiment, the matched operating system is reported to a network reporting mechanism. Method 400 is executed for each packet intercepted on the network.

Figure 5:
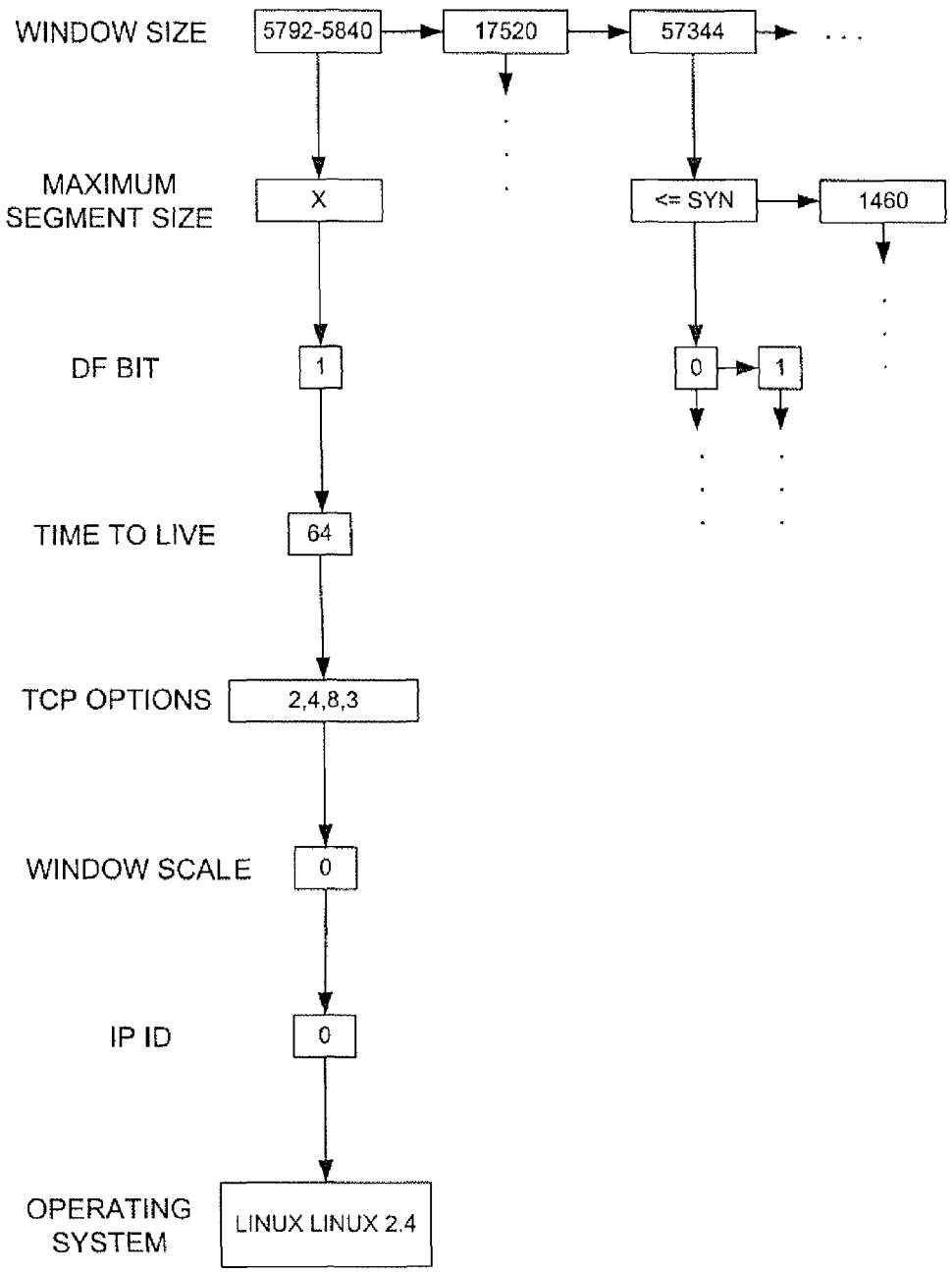
FIG. 5 is an exemplary fingerprint table, in accordance with an embodiment of the present invention.

FIG. 5 is an exemplary fingerprint table, in accordance with an embodiment of the present invention. In this embodiment, the fingerprint table is implemented as a linked list. The operating system fingerprint table can be implemented in other ways as well, including implementation as a balanced tree (B-tree) or Adelson-Velski Landis tree (AVL-tree). In this embodiment, network and transport protocol fields from a packet are compared to rows in the linked list. As shown in FIG. 5, the window size field is compared to each item in the window size row. If a match is found, the next packet field in the fingerprint is compared to the item in the row immediately below the match. Again, comparisons are made with items in the row until a match is found. This process continues until a match is found with the last field or until a row is traversed without a match. If all of the parsed packet fields match a branch of the fingerprinting table, an operating system for the host has been detected and the host representative data structure is updated.

Another embodiment of the present invention is a method in which the operating system of a host is identified using separate network and application fingerprints. A "network fingerprint" is one or more packet fields within a network protocol or transport protocol used to uniquely define a host. An "application fingerprint" is one or more fields within an application protocol used to uniquely define a host.

In this method, a transmitted packet is read on a network. The packet is decomposed into network protocol fields, transport protocol fields, and application protocol fields. These fields are stored in the host representative data structure as network protocols, transport protocols, TCP service data structures, and UDP service data structures (as shown in FIG. 2). Packets containing network and transport protocol fields are compared with the network fingerprint tables, packets containing application protocol fields are compared with the application fingerprint tables, and packets containing both network protocol fields, transport protocol fields, and application protocol fields are compared with both the network fingerprint tables and application fingerprint tables. Any matched operating systems are reported to a network reporting mechanism. IP is an exemplary network protocol. TCP is an exemplary network protocol. Network basic input/output system/server message block (NETBIOS/SMB) is an exemplary application protocol.

In one embodiment of this method, the type of host is identified and used to select the network fingerprint table that is compared to the network and transport protocol fields. Types of hosts include an initiator and a responder. For a host computer, an initiator is referred to as a client, and a responder is referred to as a server.

Figure 6:
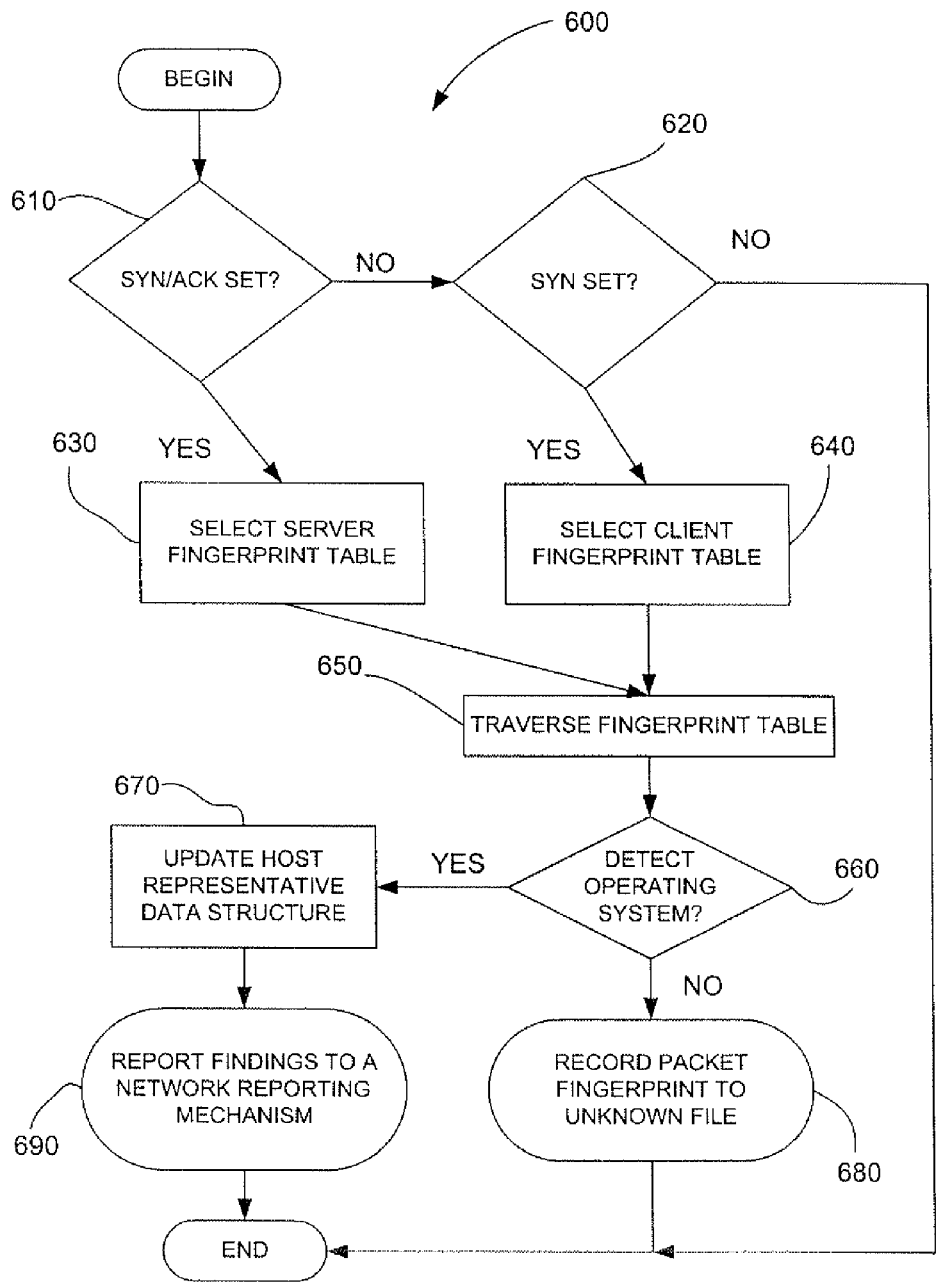
FIG. 6 is a flowchart showing a method for determining an operating system from network protocol fields where the fingerprint table is selected based on the type of host, in accordance with an embodiment of the present invention.

FIG. 6 is a flowchart showing a method 600 for determining an operating system from network protocol fields where the fingerprint table is selected based on the type of host, in accordance with an embodiment of the present invention. In method 600, network protocol fields have already been decoded from a transmitted packet and stored in a host representative data structure.

In step 610, a TCP flag field is used to determine if the packet is from a server or client computer. In particular, the synchronization acknowledged (SYN/ACK) flag is queried first. If the SYN/ACK flag is set, then the packet was being sent by a server and step 630 is executed. If the SYN/ACK flag is not set, then step 620 is executed.

In step 620, the (synchronization) SYN flag is queried. If the SYN flag is set, then the packet was sent by a client and step 640 is executed. If the SYN flag is not set, then the method ends.

In step 630, a server fingerprint table is selected for packets sent by servers.

In step 640, a client fingerprint table is selected for packets sent by clients.

In step 650, the selected fingerprint table is traversed. Other decoded network fields are compared to the selected fingerprint table.

In step 660, a decision is made as a result of the comparison with the selected fingerprint table in step 650. If the operating system is found, step 670 is executed. If an operating system is not found, step 680 is executed.

In step 670, the host representative data structure is updated with the matched operating system.

In step 680, the fingerprint of the network fields is recorded in an unknown fingerprint file.

In step 690, a matched operating system is reported to a network reporting mechanism.

In another embodiment of the present invention, a "network fingerprint" includes the window size, maximum segment size, (don't fragment) DF bit, TCP options list, window scale, IP Id trend, and TTL fields of a TCP/IP packet. These packet fields are parsed for comparison with the selected fingerprint table. In the case of server fingerprints, the server network protocol fields are influenced by the corresponding client packet. The server fingerprint matching masks the fields of the server packet and the target fingerprint by the fields of the client packet prior to comparing the fields.

Figure 7:
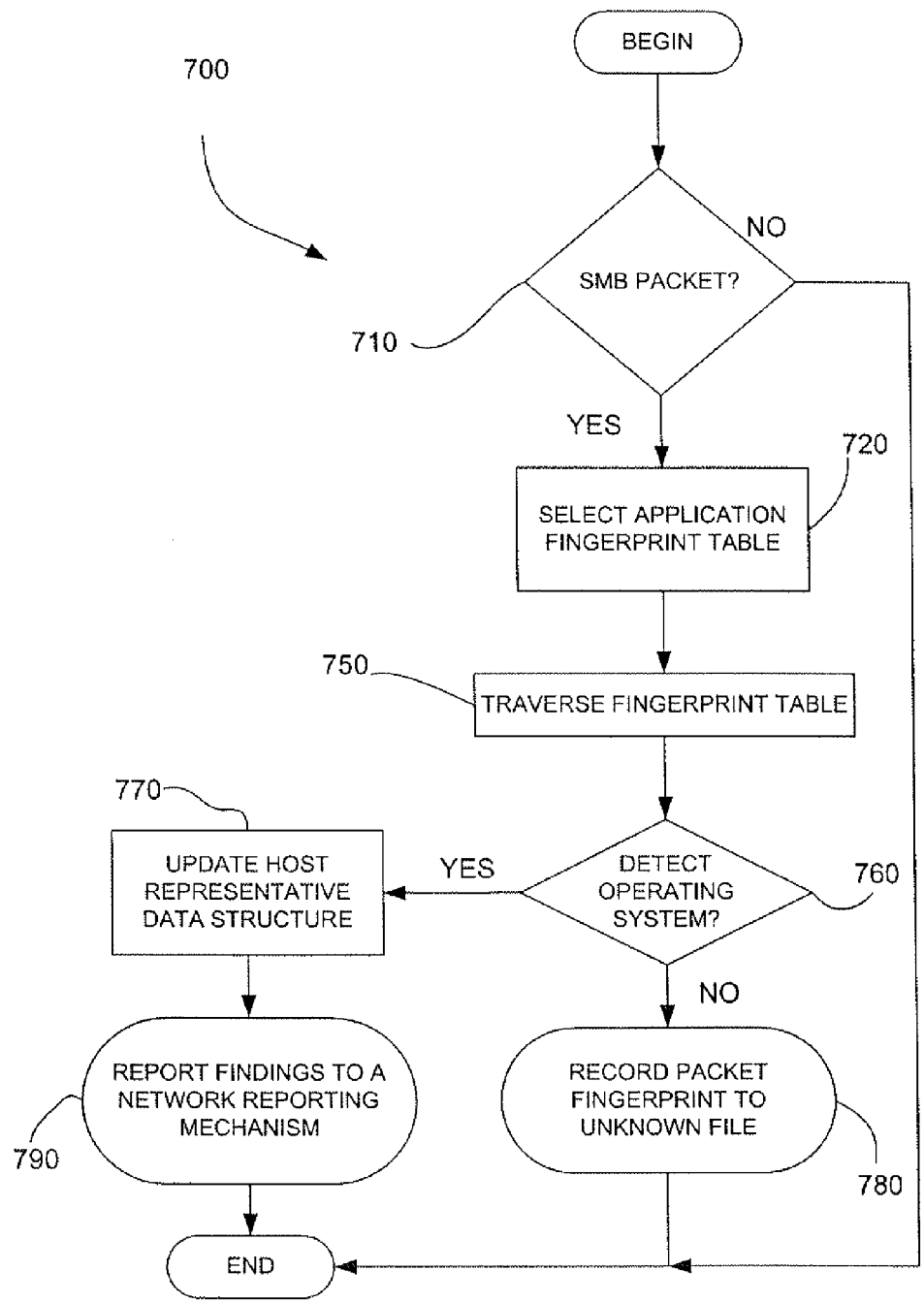
FIG. 7 is a flowchart showing a method for determining the operating system from application protocol fields where the fingerprint table is selected based on an application protocol, in accordance with an embodiment of the present invention.

FIG. 7 is a flowchart showing a method 700 for determining the operating system from application protocol fields where the fingerprint table is selected based on an application protocol, in accordance with an embodiment of the present invention. In method 700, application protocol fields have already been decoded from a transmitted packet and stored in a host representative data structure.

In step 710, it is determined if the application protocol fields are from an SMB protocol packet contained within a NETBIOS datagram packet. If the application protocol fields are from an SMB protocol packet, step 720 is executed. If the application protocol fields are not from an SMB protocol packet, then the method ends.

In step 720, an application fingerprint table is selected for comparison with the application protocol fields.

In step 750, the application protocol fields are compared to the selected application fingerprint table. In one embodiment of this method, the operating system (OS) major number, OS minor number, and flag fields from the SMB protocol are combined to generate a key for indexing into the application fingerprint table, which is a hash table.

In step 760, a decision is made as a result of the comparison with the selected application fingerprint table in step 750. If the operating is found, step 770 is executed. If an operating system is not found, step 780 is executed.

In step 770, the host representative data structure is updated with the matched operating system.

In step 780, the application fingerprint of the application protocol fields is recorded in an unknown fingerprint file.

In step 790, a matched operating system is reported to a network reporting mechanism.

As shown in FIG. 2, the host representative data structure includes at least one operating system obtained by traversing the appropriate fingerprinting table and other information about the host gained directly from the packet as described above. It also has lists of TCP and UDP host services that can be added as described below. A host representative data structure is used as input to an IDS or an NMS. If the parsed packet fields do not match a column of a fingerprint table, the packet fields are written to an unknown fingerprint file. Items from this file may later be added to the fingerprinting table when the operating system they describe is identified.

When a host generates traffic that has fingerprints within multiple fingerprint tables, the operating system that is chosen for the host representative data structure is based on fingerprint table priority. The most reliable fingerprinting method is application based fingerprinting and is thus the highest priority fingerprint table. The server packets are influenced by the client packets and are thus the lowest priority fingerprints.

In one embodiment of the present invention, a fingerprint table is created from a database table. FIG. 8 shows an exemplary fingerprint database entry, in accordance with this embodiment. Each database row in a table represents parsed packet fields that correspond to a type of operating system. Database rows are grouped based on the type of fingerprint table. Exemplary groupings for a network server fingerprint table, a network client fingerprint table and an application fingerprint table are shown in FIG. 8. In one embodiment of the present invention, the fingerprint database is created and updated manually. Items originally created in the unknown fingerprint file may be moved to the fingerprint database when the operating system is identified.

After identifying each host on the network, an embodiment of the present invention identifies services running on each host. In one embodiment, the services being run on servers are identified using TCP/IP ports. Clients generally use random ports to connect to servers, but servers generally connect to clients through fixed ports. Most services use specific or default ports. By examining traffic between clients and specific server ports, the type of service can be deduced. For example, traffic to and from a server port 80 suggests the server is a web server. The packets of this traffic can then be parsed to determine the exact type of web server. Having identified the host in the previous step, each service found for each host can be added to a list of services data structure attached to the host representative data structure of the host, as shown in FIG. 2.

Because embodiments of the present invention continuously examine network traffic, the invention provides a third function of recording any changes occurring on the network in real-time. As described above, embodiments of the present invention can immediately update changes that have occurred to fields parsed directly from a packet. This information includes but is not limited to the IP address, MAC address and TTL parameter of the server. The invention can also update information obtained through other means in real-time. For example, such information includes the operating system and the services running on a particular host. This function makes the invention particularly advantageous over manual and active automatic methods.

An additional function of embodiments of the present invention is that they allow information to be gathered in a format that can be used to enhance intrusion detection systems or to provide continuous real-time reports of the status of the network. The host representative data structure may be used as input to an IDS. If an IDS knows the operating system and services running on a host targeted by an attack, the invention can determine whether or not the attack will be harmful. In this way, false positives can be reduced significantly. The host representative data may also be used to provide continuous real-time reports of the status of the network in an NMS. Such reports may be useful to system administrators.

Figure 9:
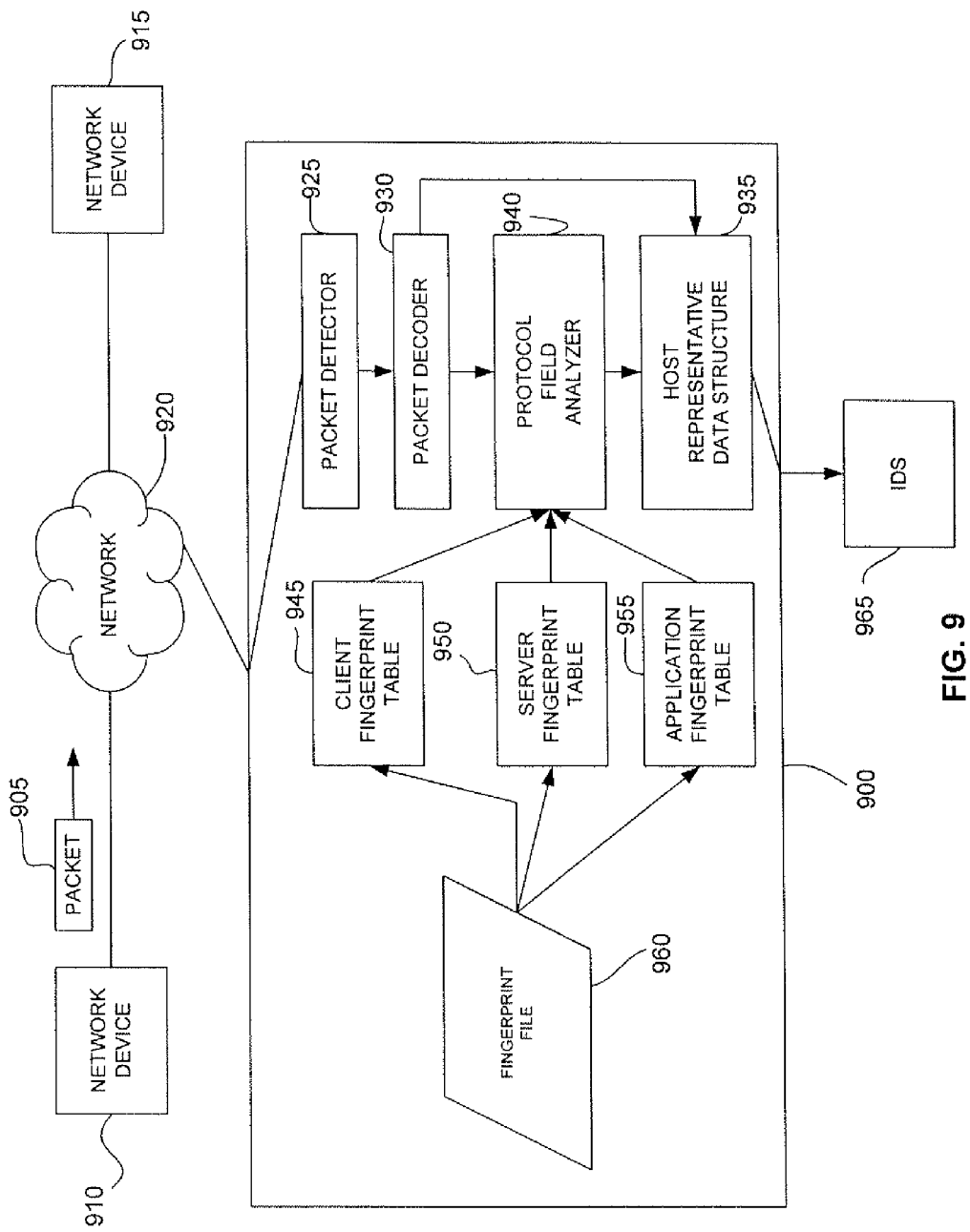
FIG. 9 is a schematic diagram illustrating a system for characterizing a network, in accordance with an embodiment of the present invention.

FIG. 9 is a schematic diagram illustrating a system for characterizing a network, in accordance with an embodiment of the present invention. In FIG. 9, packet 905 is transmitted from network device 910 to network device 915 on network 920. Network 920 includes but is not limited to a local area network (LAN), wide area network (WAN), an intranet, an internet or the Internet. Network detection system 900 is coupled to network 920.

Network detection system 900 includes packet detector 925 to detect and read packet 905. A packet decoder 930 decodes packet 905 into protocol fields and records selected protocol fields in host representative data structure 935, as described above. For example, IP and MAC TCP fields are decoded from packet 905. Protocol field analyzer 940 identifies network device 910 using the protocol fields of packet 905. In another embodiment of this system, protocol analyzer 940 identifies the logical location of network device 910 on network 920 using the protocol fields of packet 905.

In another embodiment of this system, protocol analyzer 940 identifies the operating system of network device 910 using the protocol fields of packet 905. Protocol analyzer 940 compares protocol fields to a fingerprint table that contains lists of protocol field values for particular operating systems. In another embodiment of this system, packet decoder 930 decodes packet 905 into network protocol fields and application protocol fields. Protocol analyzer 940 further analyzes the network protocol fields to determine if packet 905 originated from a client or server. If packet 905 contains network protocol fields identifying network device 910 as a client, then protocol analyzer 940 selects client fingerprint table 945 for comparison with the network protocol fields. If packet 905 contains network protocol fields identifying network device 910 as a server, then protocol analyzer 940 selects server fingerprint table 950 for comparison with the network protocol fields. If packet 905 contains application protocol fields, then protocol analyzer 940 selects application fingerprint table 955 for comparison with the application protocol fields. Protocol analyzer 940 selects one or more fingerprint tables for analysis. Fingerprint tables are loaded into system 900 from fingerprint file 960 or a fingerprint table database. Fingerprint file 960 is stored in memory. The memory is internal or external to system 900. Matching operating systems are recorded in host representative data structure 935.

In another embodiment of this system, protocol analyzer 940 identifies the services running on network device 910 using the protocol fields decoded from packet 905.

In another embodiment of the present invention, protocol analyzer 940 reports the information stored in host representative data structure 935 to IDS 965 or an NMS. IDS 965 uses information from host representative data structure 935 to more effectively protect the network. For example, IDS 965 uses information about the network devices 910 and 915 to detect and prevent evasion attacks. In addition, IDS 965 uses information about network devices 910 and 915 to determine whether an attack is harmful, and only report those attacks that are harmful.

For each packet on network 920 that is detected and decoded, a host representative data structure is created. In one embodiment of the present invention, each host representative data structure is maintained. In another embodiment of the present invention, each host representative data structure is maintained if it provides new information or updates a previous host representative data structure. Each host representative data structure that is maintained is stored in a host representative data structure database, or network device database. In another embodiment of the present invention, a host representative data structure is maintained for a user configurable period of time. A last seen time field in the host representative data structure is set when the host representative data structure is created and each time it is updated.

Network Topology

In another embodiment of the present invention, a network topology is derived for a network by analyzing the information in the network device database. Objectives of mapping the network topology include identifying routers on the network, determining what subnets and masks are configured, determining distances between configured networks and the routers connecting them, and inferring networks and masks that are not directly observable.

A variety of data is used to form the network topology. Observed IP addresses and MAC address mappings based on the address resolution protocol (ARP) or dynamic host configuration protocol (DHCP) traffic are used. Observed communication between two MAC addresses on a network is used. Observed communication between two IP addresses, one local one remote, through a third local MAC address is used. Finally, operating system identification based on fingerprinting techniques is used.

In one embodiment of the present invention, a list of IP addresses and MAC addresses is stored in the network device database. When ARP or DHCP traffic is seen for a particular MAC address, it is determined that there is a tight mapping between a MAC address and an IP address. In other words, the network device with that MAC address is using that IP address, or the IP address has a "primary MAC address." Once a MAC address has been mapped as a primary, a search is conducted for other IP addresses using this MAC address that are not listed as a primary. If other IP addresses use this MAC, then the primary is identified as a router.

Figure 10:
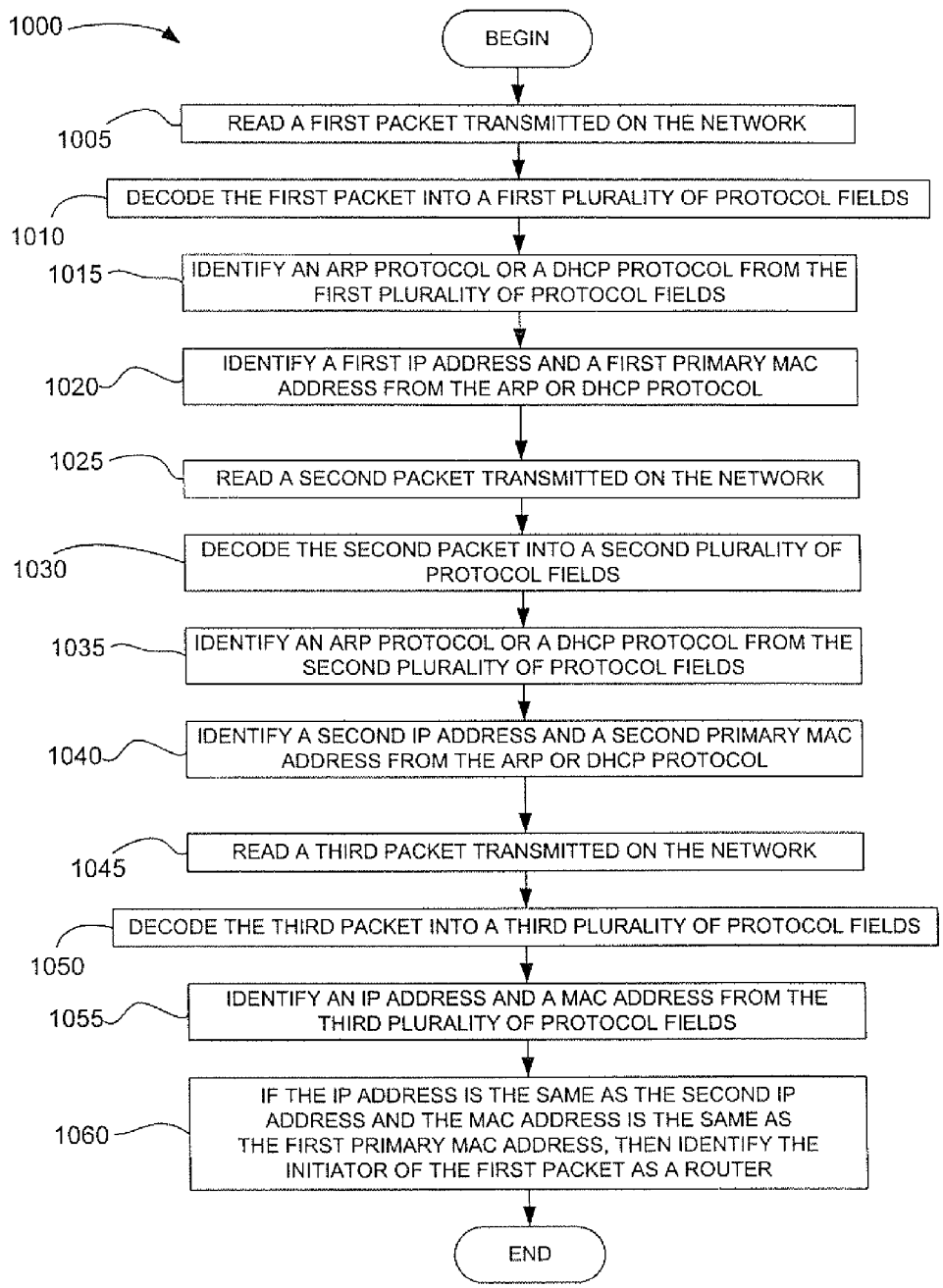
FIG. 10 is a flowchart showing a method for identifying a router on a network from two packets identifying primary media access control addresses and a third packet identifying a secondary media access control address, in accordance with an embodiment of the present invention.

FIG. 10 is a flowchart showing a method 1000 for identifying a router on a network from two packets identifying primary MAC addresses and a third packet identifying a secondary MAC address, in accordance with an embodiment of the present invention.

In step 1005 of method 1000, a first packet transmitted on the network is read.

In step 1010, the first packet is decoded into a first plurality of protocol fields. In a preferred embodiment of this method, the first plurality of protocol fields includes two or more of a network protocol field, a transport protocol field, and an application protocol field.

In step 1015, either ARP or DHCP is identified from the first plurality of protocol fields.

In step 1020, a first IP address and a first primary MAC address are identified from the ARP or the DHCP protocol.

In step 1025, a second packet transmitted on the network is read.

In step 1030, the second packet is decoded into a second plurality of protocol fields. In a preferred embodiment of this method, the second plurality of protocol fields includes two or more of a network protocol field, a transport protocol field, and an application protocol field.

In step 1035, either ARP or DHCP is identified from the second plurality of protocol fields.

In step 1040, a second IP address and a second primary MAC address are identified from the ARP or DHCP.

In step 1045, a third packet transmitted on the network is read.

In step 1050, the third packet is decoded into a third plurality of protocol fields. In a preferred embodiment of this method, the third plurality of protocol fields includes a network protocol field.

In step 1055, an IP address and a MAC address are identified from the third plurality of protocol fields.

In step 1060, if the IP address is the second IP address and the MAC address is the first primary MAC address, then an initiator of the first packet is identified as the router.

Figure 11:
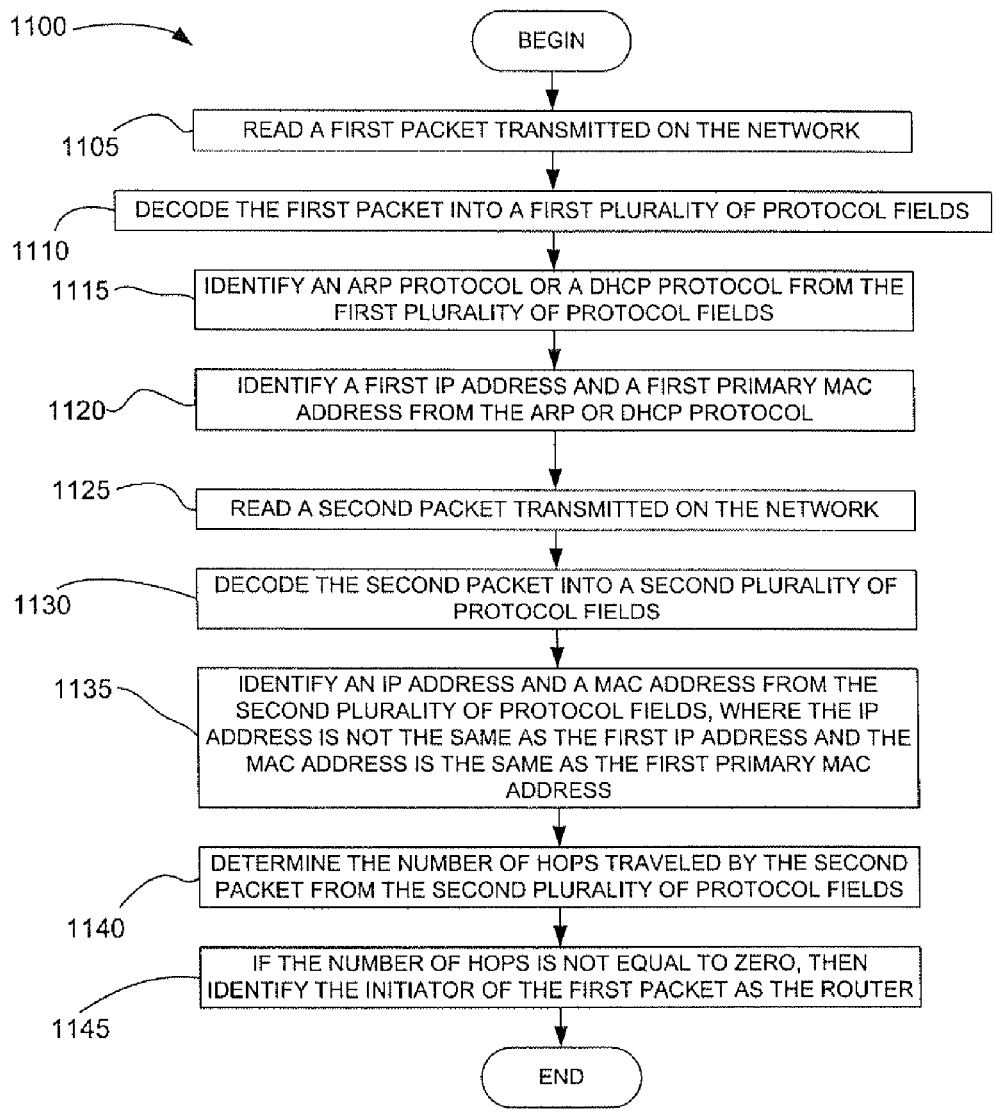
FIG. 11 is a flowchart showing a method for identifying a router on a network from one packet identifying a primary media access control address and a second packet identifying a network device at least one hop away, in accordance with an embodiment of the present invention.

FIG. 11 is a flowchart showing a method 1100 for identifying a router on a network from one packet identifying a primary MAC address and a second packet identifying a network device at least one hop away, in accordance with an embodiment of the present invention.

In step 1105 of method 1100, a first packet transmitted on the network is read.

In step 1110, the first packet is decoded into a first plurality of protocol fields. In a preferred embodiment of this method, the first plurality of protocol fields includes two or more of a network protocol field, a transport protocol field, and an application protocol field.

In step 1115, either ARP or DHCP is identified from the first plurality of protocol fields.

In step 1120, a first IP address and a first primary MAC address are identified from the ARP or the DHCP.

In step 1125, a second packet transmitted on the network is read.

In step 1130, the second packet is decoded into a second plurality of protocol fields. In a preferred embodiment of this method, the second plurality of protocol fields includes two or more of a network protocol field, a transport protocol field, and an application protocol field.

In step 1135 an IP address and a MAC address are identified from the second plurality of protocol fields, where the IP address is not the same as the first IP address and the MAC address is the same as the first primary MAC address.

In step 1140, the number of hops traveled by the second packet is determined from the second plurality of protocol fields. In a preferred embodiment of this method, the number of hops traveled is determined by identifying the operating system transmitting the packet and calculating the difference between the time-to-live value of the second packet and the time-to-live default value of the operation system. The second plurality of protocol fields is compared to an operating system identifying structure. A matched operating system is selected. The default starting time-to-live value for the matched operating system is read from the operating system identifying structure. The packet time-to-live value is read from the second plurality of protocol fields. The number of hops traveled is found by comparing the default starting time-to-live value to the packet time-to-live value.

In step 1145, if the number of hops is not equal to zero, then the initiator of the first packet is identified as the router.

In another embodiment of the present invention, subnets and masks on a network are determined by observing traffic between MAC addresses that are tightly mapped to IP addresses. This is accomplished even when observing multiple networks. Traffic between two primary MAC addresses implies that the two IP addresses belonging to these MAC addresses are on the same subnet. Once IP addresses are grouped into the same subnet, the smallest subnet and mask that includes these addresses.

Figure 12:
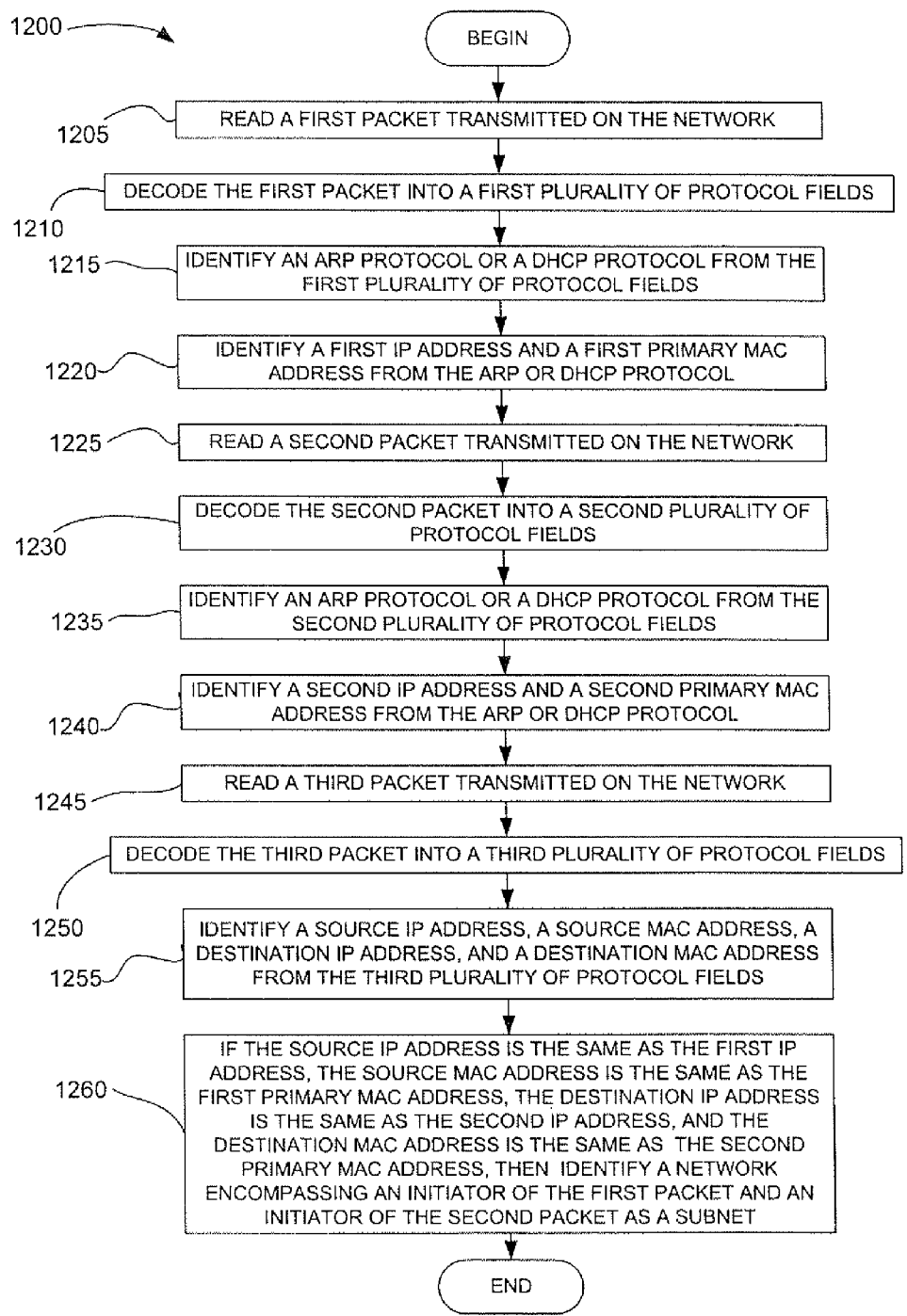
FIG. 12 is a flowchart showing a method for identifying a subnet on a network, in accordance with an embodiment of the present invention.

FIG. 12 is a flowchart showing a method 1200 for identifying a subnet on a network, in accordance with an embodiment of the present invention.

In step 1205 of method 1200, a first packet transmitted on the network is read.

In step 1210, the first packet is decoded into a first plurality of protocol fields. In a preferred embodiment of this method, the first plurality of protocol fields includes two or more of a network protocol field, a transport protocol field, and an application protocol field.

In step 1215, either ARP or DHCP is identified from the first plurality of protocol fields.

In step 1220, a first IP address and a first primary MAC address are identified from the ARP or the DHCP.

In step 1225, a second packet transmitted on the network is read.

In step 1230, the second packet is decoded into a second plurality of protocol fields. In a preferred embodiment of this method, the second plurality of protocol fields includes two or more of a network protocol field, a transport protocol field, and an application protocol field.

In step 1235, either ARP or DHCP is identified from the second plurality of protocol fields.

In step 1240, a second IP address and a second primary MAC address are identified from the ARP or the DHCP.

In step 1245, a third packet transmitted on the network is read.

In step 1250, the third packet is decoded into a third plurality of protocol fields. In a preferred embodiment of this method, the third plurality of protocol fields includes a network protocol field.

In step 1255, a source IP address, a source MAC address, a destination IP address, and a destination MAC address are identified from the third plurality of protocol fields.

In step 1260, if the source IP address is the same as the first IP address, the source MAC address is the same as the first primary MAC address, the destination IP address is the same as the second IP address, and the destination MAC address is the same as the second primary MAC address, then a network encompassing an initiator of the first packet and an initiator of the second packet is identified as a subnet.

In a preferred embodiment of this method, the smallest address space for the subnet is calculated from the first IP address and the second IP address. A bitwise exclusive-OR operation is performed with the first IP address and the second IP address to produce an intermediate result. A network mask of the subnet is calculated by counting the significant bits of the intermediate result. Either the first IP address or the second IP address is selected and a bitwise AND operation is performed with the network mask to produce the network number. The smallest address space is defined as the network mask and the network number.

If another network device is observed communicating to an address already in the observed network or subnet, the other address is also placed in the observed network. The address of the new network device is found by reading, decoding, and analyzing a packet containing ARP or DHCP. The IP address and primary MAC address are found by decoding the ARP or DHCP. The new device is identified as residing on the same network by reading, decoding, and analyzing a packet, where the source IP address is the IP address of the new network device, the source MAC address is the primary MAC address of the new network device, the destination IP address is the address of a network device known to be on the observed network, and the destination address is the primary MAC address of the network device known to be on the observed network. If the address is already within the bounds of the address/mask, no changes are made to the observed network. If the address is outside the existing observed network, the observed network is expanded to include the new address.

This process of expanding the subnets and masks to include new observed addresses continues indefinitely. When hosts from two different networks are observed talking to each other, the two networks are merged into a single network. Eventually, the list of observed subnets and masks contains a complete list of subnets and masks.

In another embodiment of the present invention, the logical distance between networks is obtained. If traffic is seen between two hosts in two different observed networks, the host between the two hosts is found to be a router connecting these two networks. The router has a primary MAC address and a secondary MAC address. If TTL values seen with the MAC addresses for the two hosts are provided, the distance between the observed networks is found by subtracting the TTL value seen with the secondary MAC from the TTL value seen with the primary MAC.

Figure 13:
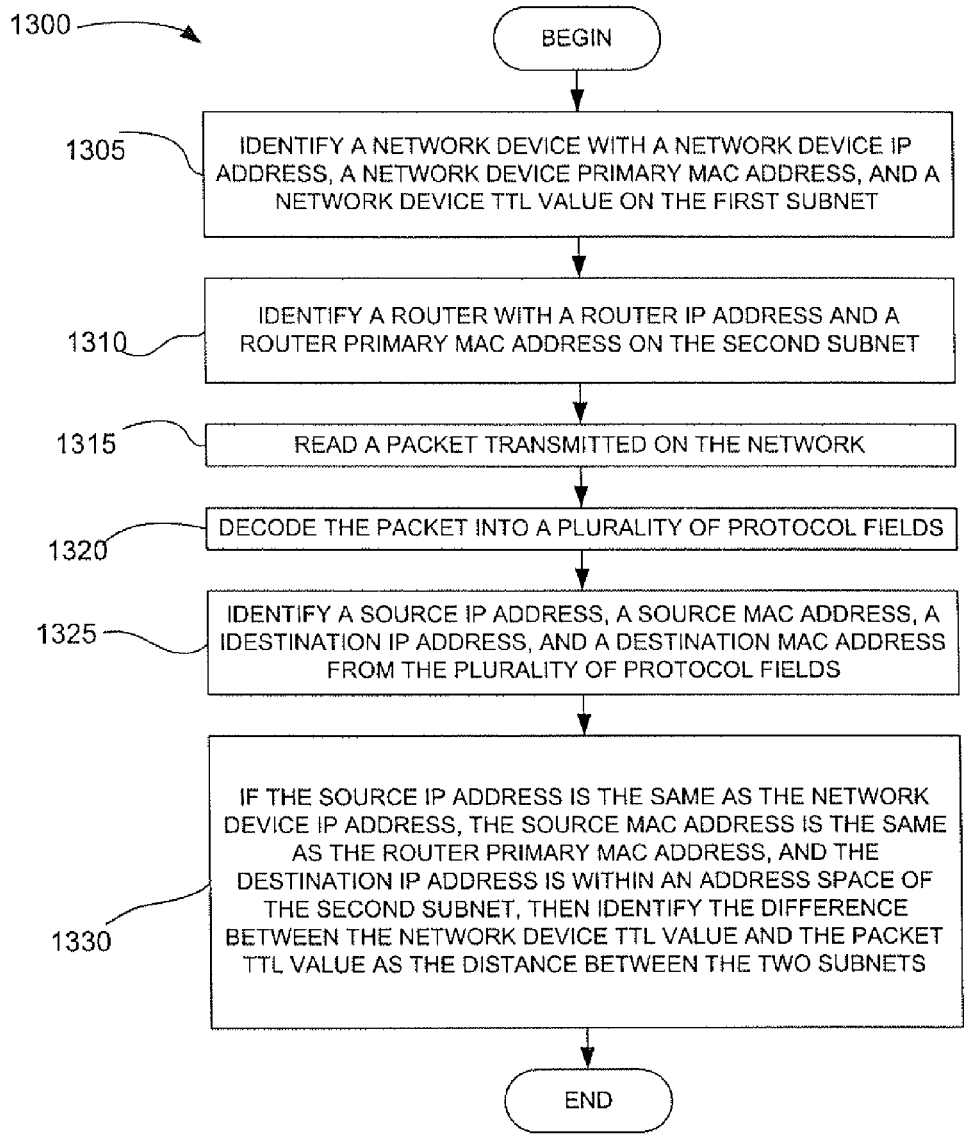
FIG. 13 is a flowchart showing a method for determining the distance between two subnets on a network, in accordance with an embodiment of the present invention.

FIG. 13 is a flowchart showing a method 1300 for determining the distance between two subnets on a network, in accordance with an embodiment of the present invention.

In step 1305 of method 1300, a network device with a network device IP address, a network device primary MAC, and a network device TTL value is identified on the first subnet.

In step 1310, a router with a router IP address and a router primary MAC address is identified on the second subnet.

In step 1315, a packet transmitted on the network is read.

In step 1320, the packet is decoded into a plurality of protocol fields.

In step 1325, a source IP address, a source MAC address, a destination IP address, and a packet TTL value are identified from the plurality of protocol fields.

In step 1330, if the source IP address is the same as the network device IP address, the source MAC address is the same as the router primary MAC address, and the destination IP address is within an address space of the second subnet, then the distance between the two subnets is the difference between the network device TTL value and the packet TTL value.

In another embodiment of the present invention, inferred networks or inferred subnets are determined. When new IP addresses are seen that have not been directly observed and do not fall into an existing network definition, the host is placed into an inferred network. An inferred network is created for the IP address, with an initial subnet mask of 255.255.255.255. The distance from the observed networks is set to equal to the difference between the TTL value found and the default TTL for the operating system based on the operating system fingerprint (if it exists).

Once the inferred network is created, new non-observed hosts are added to it and the network address and mask are expanded to include the new inferred host if the new network and mask does not conflict with an existing network and mask, and if the distance metric for the host is the same as existing hosts in the network. This may not be possible if the operating has not yet been identified but, even if this technique is not used, closer inferred networks will be created with finer granularity than distant networks.

If a host in an inferred network is later seen to be on a local network, the host is removed from the inferred network and placed in appropriate observed network. This action causes the inferred network to be recalculated from the remaining hosts, and, if the addition of the host to the observed network changes the network address or mask for the observed network, all inferred networks are re-verified to ensure they do not conflict with the new observed network definition.

Figure 14:
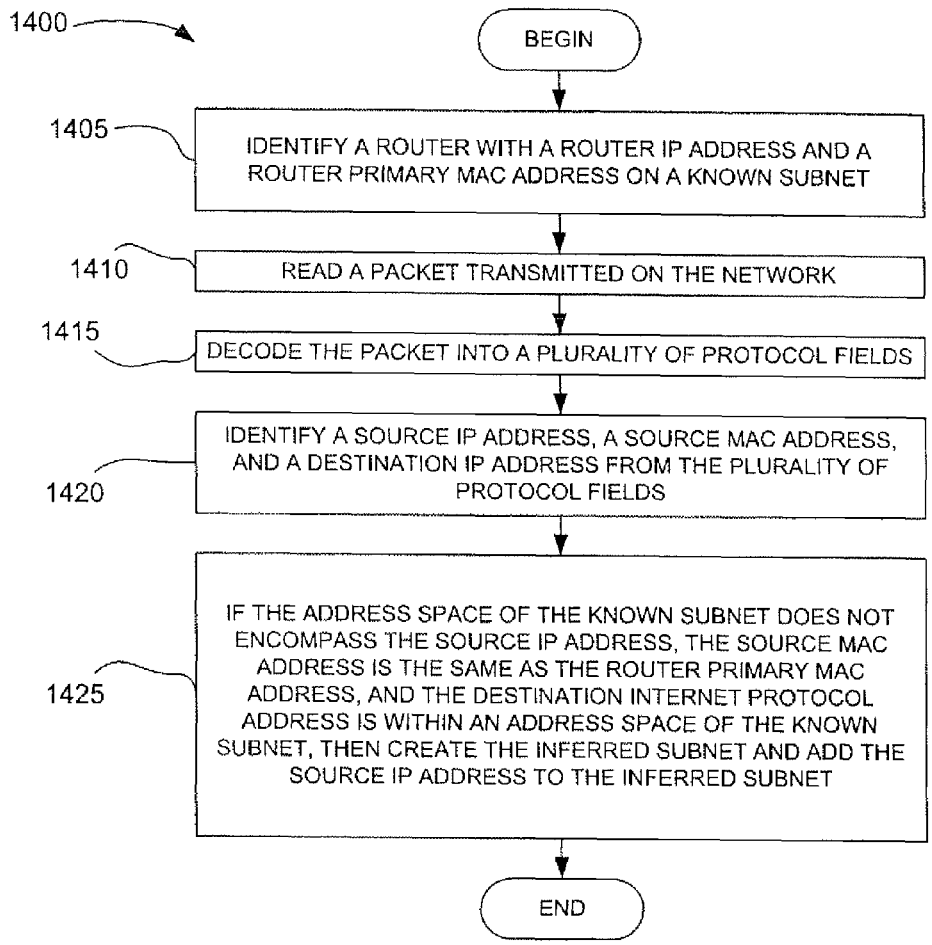
FIG. 14 is a flowchart showing a method for creating an inferred subnet on a network, in accordance with an embodiment of the present invention.

FIG. 14 is a flowchart showing a method 1400 for creating an inferred subnet on a network, in accordance with an embodiment of the present invention.

In step 1405 of method 1400, a router with a router IP address and a router primary MAC address are identified on a known subnet.

In step 1410, a packet transmitted on the network is read.

In step 1415, the packet is decoded into a plurality of protocol fields.

In step 1420, a source IP address, a source MAC address, and a destination IP address are identified from the plurality of protocol fields.

In step 1425, if the address space of the known subnet does not encompass the source IP address, the source MAC address is the same as the router primary MAC address, and the destination Internet protocol address is within an address space of the known subnet, then the inferred subnet is created and the source IP address is added to the inferred subnet.

Operating System Identification Techniques

In another embodiment of the present invention, an application identifies the underlying operating system on which it runs. Client broadcasted SMB traffic on UDP port 138 is examined. This is the most accurate means of differentiating among various versions of Windows™, since most Windows™ hosts run this, and there is no known way of altering the fields used for identification.

Specifically, Microsoft Windows™ browser protocol host announcements or Microsoft Windows™ browser local master announcements are inspected for two associated fields—the OS Major Version and Minor Version. Further, the Server Type field of the announcement messages can be examined to distinguish Windows NT™ hosts from Windows 98™ and Windows ME™. These values do not appear to be readily alterable.

In another embodiment of the present invention, the host operating system is identified by examining specific field values in the IP and TCP headers of a client host. A client host is identified as a host sending an initial SYN message.

In another embodiment of the present invention, the host operating system is identified after identifying a host as a server. In this embodiment too, specific field values in the IP and TCP headers of a server host are examined. A server is identified as a host responding with a SYN/ACK message on a listening port to a client request.

In both the embodiment identifying a client host and the embodiment identifying a server host, the same fields in a packet are examined. These fields include but are not limited to a TCP window size value, a DF value, a TTL value, and TCP options. A TCP window size value identifies the maximum number of bytes that will be buffered for the input received from the current connection. This field can be very distinct because the valid range of values is between 0 and 65535. Yet, this value can be easily changed by the system administrator by customizing a registry setting or TCP/IP stack parameter. In fact, IIS servers are often optimized to accept the largest possible buffer size in order to facilitate data transfer.

While TCP window size value can help to distinguish among operating systems, it is volatile because it is readily influenced by a variety of factors. As an example, certain versions of Windows™ hosts that reside on a 10 Mbps hub may yield a different default TCP window size than the same host moved to a 100 Mbps hub. The window size value is even more temperamental and variable when a server responds to a client SYN packet. In can be influenced by values in the SYN packet such as maximum segment size, window size, and the number and types of TCP options offered. Rarely, but as observed with HP printers, it may even change depending on the listening port on a server host.

The DF value indicated whether the packet may or may not be fragmented. It has a value of either 0 or 1. Most operating systems turn this flag on, however a handful disable it. It is simple to change the value of this field.

The TTL value identifies the number of hops a packet may traverse before being expired. It has a possible value range of 0-255. Typical initial values are 255, 128, 64, 60, and 32. An initial TTL value of 255 may be found in Cisco IOS versions, older Solaris™, and various other operating systems. An initial value of 128 is found in most modern Window versions, while TTL's of 64 and 60 typically reflect UNIX operating systems. A value of 32 is less common and may be associated with older versions of Windows™. This value is easily configurable.

Exemplary TCP options that are examined include the maximum segment size, the window scale, the timestamp, and the selective acknowledgement. The maximum segment size, window scale, and timestamp may contain unique values that help identify the operating system. For instance, only Windows™ hosts respond with a value of zero in both timestamp fields on a SYN/ACK packet. Support for a given TCP option or options is customizable. While TCP options are predictable and stable in SYN packets for a given operating system, server TCP options are offered only if they are observed in the client SYN packet. As an example, a server will only respond in the SYN/ACK packet with a selective acknowledgement in the TCP options if the client SYN packet included it as a TCP option. The only exception to this rule is that the maximum segment size is always included in the server SYN/ACK packet regardless if it is set in the stimulus client packet. In fact, "normal" client SYN traffic will always include a maximum segment size in the TCP options. If nmap is employed to do SYN scanning or operating system identification, it will not follow the standard behavior of including the maximum segment size in the SYN packet. However, the target server SYN/ACK will still include it in the response.

The maximum segment size value in a server SYN/ACK packet is usually set to be 40 bytes less than the MTU, although some operating systems appear to set static values that do not reflect the MTU. Occasionally, an operating system such as SunOS™ 5.7 running on SPARC™ architecture will simply reflect back the value found in the SYN packet.

Almost any combination of TCP options is valid. The only restriction appears to be that the set of options must end on a 4-byte boundary. The NOP is a 1-byte TCP option used to align on a 4-byte boundary. Infrequently, an operating system may use the EOL TCP option as the final pad. Most operating systems pre-pad a NOP to precede an option which must be padded. Individual TCP options used have a format that must be followed.

In one embodiment of the present invention, the operating system is identified from a match from only one of the three embodiments mentioned above. The order in which these embodiments are employed is application inspection, followed by client packet analysis, and finally server packet examination, if the previous embodiments do not find a match. When client or server packet inspection is employed, all examined packet values must match all respective values identified in a given operating system fingerprint. In addition, the fingerprint that first matches the packet values is deemed to be the host operating system even if there are other fingerprints that match. The embodiment is referred to as a "first match and out" approach.

In another embodiment of the present invention, the operating system is obtained directly from text an application places in a packet. This text is referred to as a banner. For example, some telnet and file transfer protocol (FTP) servers display a banner that reflects the actual operating system.

Not many well-used applications exist that explicitly detail the operating system in the banner; however, there are a multitude of applications whose banners reveal the exact application and version information. These may be used as contributing piece of evidence for chronological assessment between the application and operating system. For instance, if it is discovered that Internet information Service (IIS) 6.0 is running on the host, it is known that it requires a Windows™ 2003 server and nothing pre-dating Windows 2003™. This method useful if the number of applications is restricted to commonly used ones that can provide specific information about the native operating system.

In another embodiment of the present invention, the operating system is obtained or eliminated indirectly by examining operating system and application combinations. For example, if the operating system has been identified on a host via client or server TCP fingerprinting as a UNIX variant, but the Internet information Service (IIS) is also running on that host, the TCP fingerprinting identification is incorrect. In this case, application identification takes precedence over TCP fingerprint identification.

In another embodiment of the present invention, offered ports or port groups are used to identify an operating system. There are unique instances where a particular service or listening port assists in operating system identification. For example, TCP port 1508 appears to be listening on HP-UX hosts only and TCP port 407 appears to be listening on MAC OS hosts. For this method of identification to be practical and useful, the ports that are examined must be exclusive to one particular operating system or a small set of possible operating systems. There is little to be gained from the use of something like NetBIOS/SMB ports since they have cross-platform support.

Port groups also identify operating systems. For example, Windows™ operating systems beginning with Windows 2000™ enable TCP ports 135, 139, and 445 and a modern version of Linux will enable TCP ports 22, 111, 515, 948, and 6000.

The absence of support for a particular port or port group may supply concomitant indicate an operating system as well. For example, if it is not possible to tell if a given host is a Windows™ variant or Linux variant running SMB, the absence of support for a secure shell server on port 22 would logically indicate a Windows™ classification since most default Linux installs enable port 22.

In another embodiment of the present invention, the use of a port is used to eliminate previous versions of operating systems. For example, TCP port 445 was first used by Windows 2000™ hosts. Earlier versions are, then, eliminated from consideration.

Services Identification

In another embodiment of the present invention, a service on a host is identified from its data. Services are generally served on well-known ports of a host. It is possible for an administrator or an unauthorized user acting as an administrator, however, to configure a system to bind services to alternate ports. It is also possible for a machine infected with a virus to bind services to non-standard ports. For this reason it is necessary to validate a service based on its data rather than its port.

Service identification is implemented by overlaying the protocol of a service on the given packet stream and validating the fields and flow of the protocol. The protocol validation is verified using one server packet or many client and server packets depending on the protocol.

An exemplary method of service identification using one server packet is used to identify a domain name server (DNS) service. DNS protocol packet has a structure documented within an Internet request for comments (RFC) document. This structure includes the following requirements. The packet contains at least enough data for a DNS header. The DNS response bit is set. The operation code is within the correct range. The Z flag is clear. The return code is within the correct range. The truncated flag is clear. The response records are then verified for structure and content.

Figure 15:
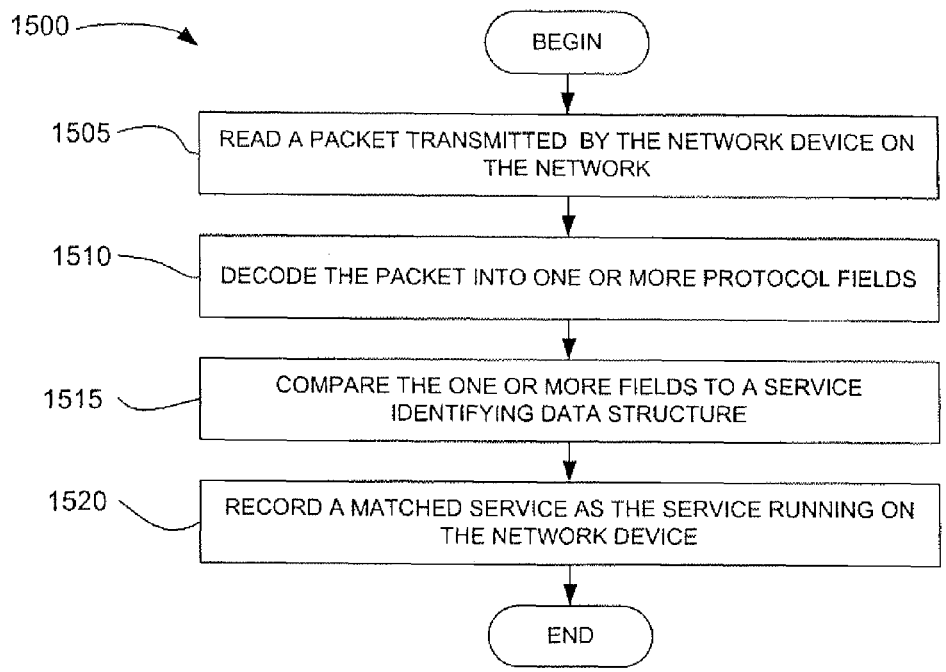
FIG. 15 is a flowchart showing a method for identifying a service running on a network device from a packet, in accordance with an embodiment of the present invention.

FIG. 15 is a flowchart showing a method 1500 for identifying a service running on a network device from a packet, in accordance with an embodiment of the present invention.

In step 1505 of method 1500, a packet transmitted by the network device on the network is read.

In step 1510, the packet is decoded into one or more protocol fields.

In step 1515, the one or more fields are compared to a service identifying data structure. A service identifying data structure contains predefined protocol fields that identify a service.

In step 1520, a matched service is recorded as the service running on the network device.

An exemplary method of service identification using multiple connections and multiple packets from both the client and the server is used to identify a remote shell (RSHELL) service. The error socket port is extracted and validated from a client packet. A new connection is made from a server to the client connecting to the extracted port. A username and command are read from the client packet and verified to be printable. A server response is verified to be a one-byte packet.

In another embodiment of the present invention, a service is identified directly from the packet. For some services, the service vendor and version can be parsed from the server packets. For example, a hypertext transport protocol (HTTP) header packet contains a "server=" entry followed by the vendor and version separated with a slash character and terminated with a carriage return character.

Some services contain sub services. For example, the remote procedure call (RPC) service maps sub services to various ports. The RPC header contains a field that specifies the sub service type. This field is extracted and represented as a readable string to further define the capabilities of the service.

Figure 16:
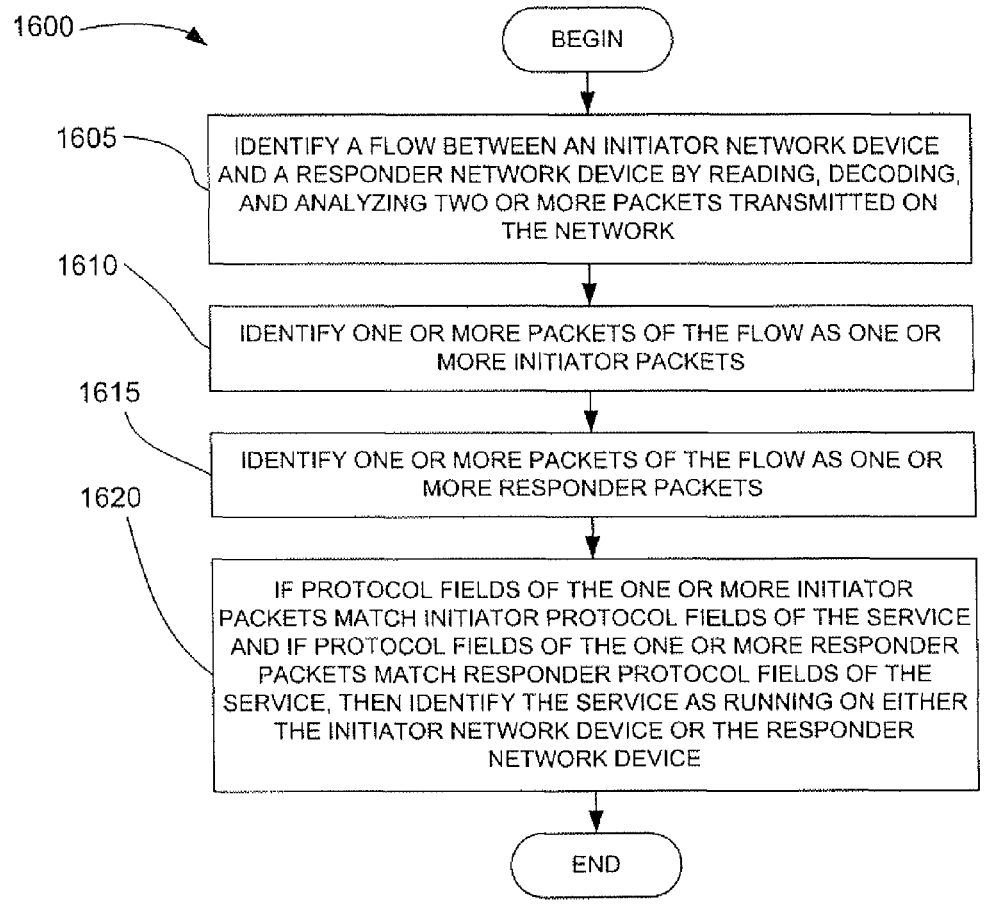
FIG. 16 is a flowchart showing a method for identifying a service running on a network device from two or more packets, in accordance with an embodiment of the present invention.

FIG. 16 is a flowchart showing a method 1600 for identifying a service running on a network device from two or more packets, in accordance with an embodiment of the present invention.

In step 1605 of method 1600, a flow between an initiator network device and a responder network device is identified by reading, decoding, and analyzing two or more packets transmitted on the network.

In step 1610, one or more packets of the flow are identified as one or more initiator packets.

In step 1615, one or more packets of the flow are identified as one or more responder packets.

In step 1620, if protocol fields of the one or more initiator packets match initiator protocol fields of the service and if protocol fields of the one or more responder packets match responder protocol fields of the service, then the service is identified as running on either the initiator network device or the responder network device.

Figure 17:
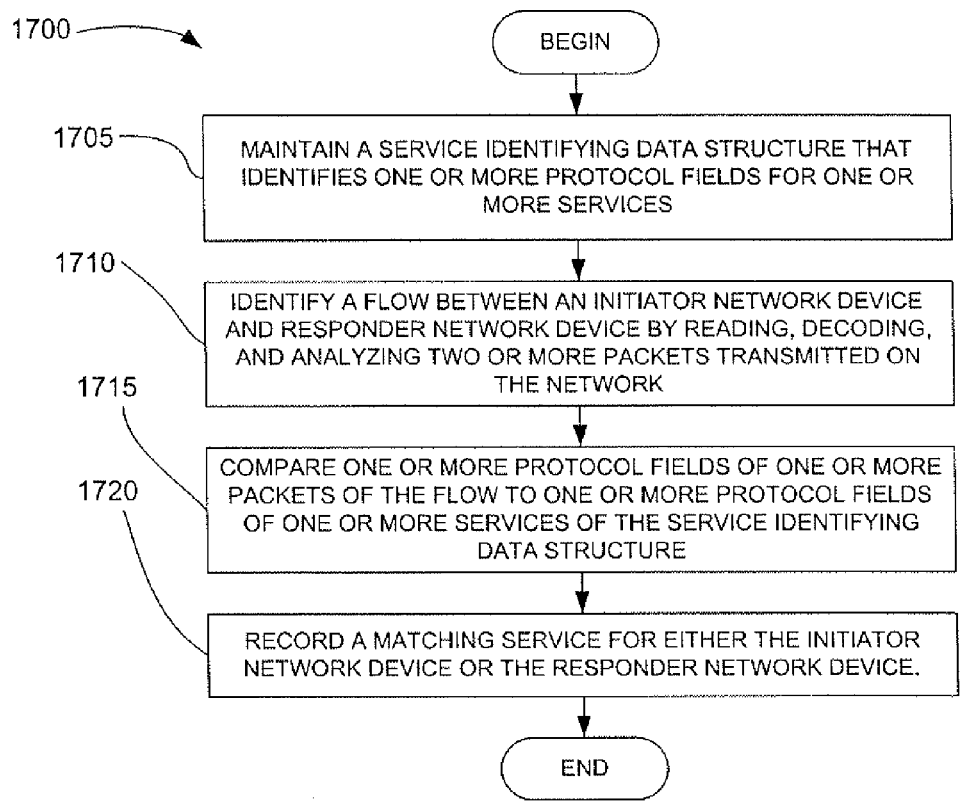
FIG. 17 is a flowchart showing a method for identifying a service running on a network device by comparing protocol fields of one or more packets from a flow to a service identifying data structure, in accordance with an embodiment of the present invention.

FIG. 17 is a flowchart showing a method 1700 for identifying a service running on a network device by comparing protocol fields of one or more packets from a flow to a service identifying data structure, in accordance with an embodiment of the present invention.

In step 1705 of method 1700, a service identifying data structure is maintained that identifies one or more protocol fields for one or more services.

In step 1710, a flow between an initiator network device and responder network device is identified by reading, decoding, and analyzing two or more packets transmitted on the network.

In step 1715, one or more protocol fields of one or more packets of the flow are compared to one or more protocol fields of one or more services of the service identifying data structure. In one embodiment the service identifying data structure identifies protocol fields from packets sent by both the initiator and the responder.

In step 1720, a matching service is recorded for either the initiator network device or the responder network device. Services are typically found on the responder, but may also be found on the initiator.

In another embodiment of method 1700, one or more services of the service identifying data structure are grouped by port number. A flow port number of the one or more packets of the flow is identified. The one or more protocol fields of one or more packets of the flow are compared to one or more protocol fields of one or more services of the service identifying data structure grouped by the flow port number.

In another embodiment of method 1700, one or more services of the service identifying data structure are grouped by a search pattern. A flow search pattern of one or more packets of the flow is identified. The one or more protocol fields of one or more packets of the flow are compared to one or more protocol fields of one or more services of the service identifying data structure grouped by the search pattern.

Flow Analysis

A flow is a TCP session or a UDP pseudo session. A TCP session is defined as a complete TCP session beginning with the 3-way TCP handshake, followed by data packets, and terminated with TCP tear-down sequence of finished (FIN) flags and acknowledgement (ACK) flags to the FINS. The UDP protocol is a connectionless protocol, which means that there is no connection or tear-down sequence. However, most applications that use UDP pass packets in both directions. In UDP pseudo sessions, the first packet from the client is used to create the session and all packets passed with the same IP addresses and ports are included as part of the session. The UDP session remains active until no session packets are detected for a timeout period.

Each flow is monitored and statistics about the flow a compiled and stored when the flow is terminated. Information available from a flow includes an IP address of the session initiator, an IP address of the session responder, a port of the session initiator, a port of the session responder, a time of the first packet, a time of the last packet, the number of packets sent by the session initiator, the number of packets sent by the session responder, the number of bytes sent by the session initiator, and the number of bytes sent by the session responder.

From this information it is determined what services a client typically uses, which servers a client typically utilizes, how much data a client typically transfers, how much data a server typically serves, how many connections per second a server handles, the server load during different time periods, how much traffic a client generates during different time periods, which servers clients connect to, which clients connect to a server, and what is the typical conversation size between a client and a server.

In one embodiment of the present invention, flow analysis is used to identify hosts, host operating systems, and host services. In an exemplary method of flow analysis, packets entering the flow analyzer are first classified according to the version of the IP protocol. If a packet is IP version 4, the packet is checked to see if it belongs to an existing flow. If a new flow is detected, a flow key is created consisting of the source and destination IP addresses, source and destination ports, and the IP protocol. The new flow is entered into a hash table.

The hash table has a use list and a free list and is different from a standard hash table in that a memory cap is used. Once the memory cap is hit, the hash table will discard flows. The oldest flows are discarded first. A call back function is supplied to allow a flow to be marked for deletion. The hash table performs all necessary memory management.

When a new flow is detected, the packet type determines the flow type (TCP, UDP, IP fragment, etc.). The flow type is used to determine the analysis that is to be performed. For example, if a flow is discovered and the flow type is identified as TCP hosts identification, host operating system identification, and host service identification is performed.

Figure 18:
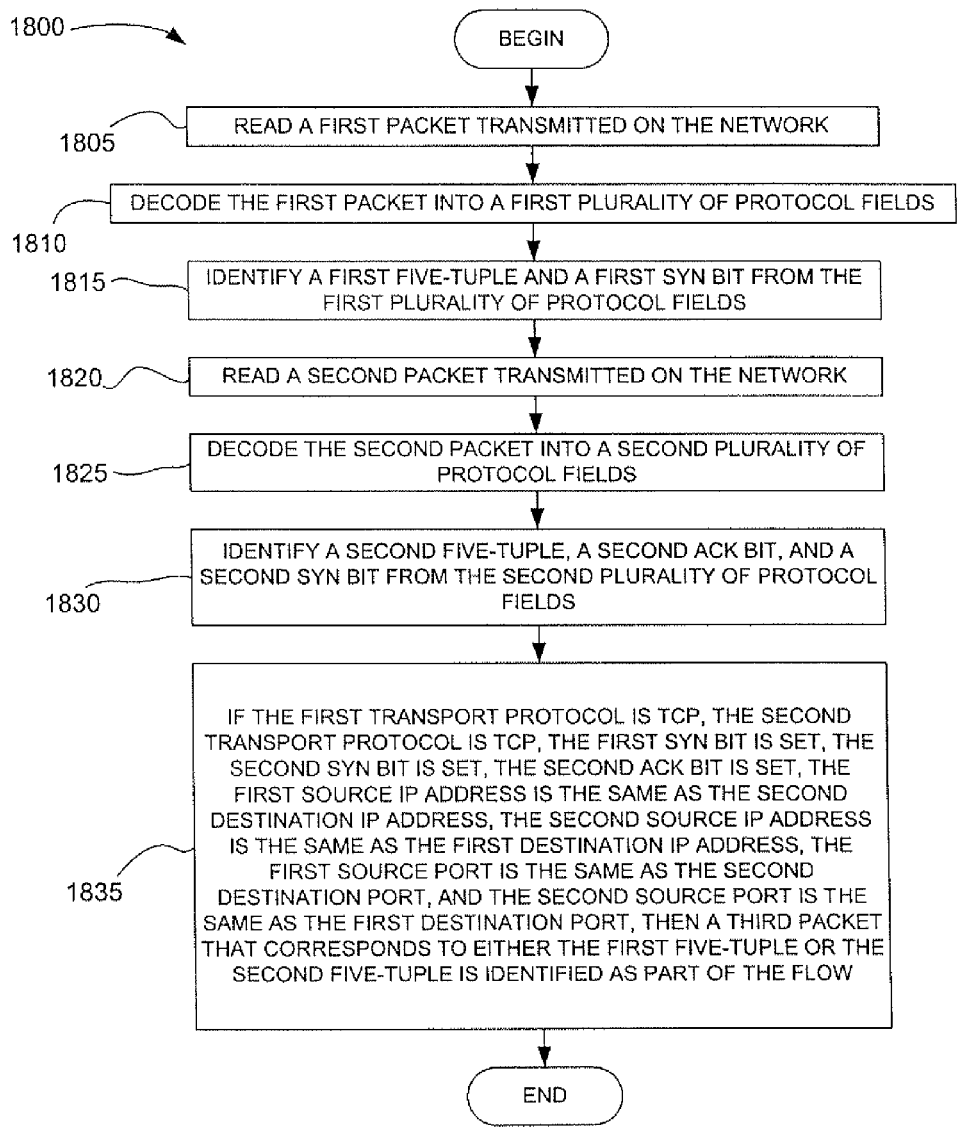
FIG. 18 is a flowchart showing a method for identifying transmission control protocol flow on a network, in accordance with an embodiment of the present invention.

FIG. 18 is a flowchart showing a method 1800 for identifying TCP flow on a network, in accordance with an embodiment of the present invention.

In step 1805 of method 1800, a first packet transmitted on the network is read.

In step 1810, the first packet is decoded into a first plurality of protocol fields.

In step 1815, a first five-tuple and a first SYN bit are identified from the first plurality of protocol fields. A first source IP address, a first destination IP address, a first transport protocol, a first source port, and a first destination port make up the first five-tuple.

In step 1820, a second packet transmitted on the network is read.

In step 1825, the second packet is decoded into a second plurality of protocol fields.

In step 1830, a second five-tuple, a second ACK bit, and a second SYN bit are identified from the second plurality of protocol fields. A second source IP address, a second destination IP address, a second transport protocol, a second source port, and a second destination make up the second five-tuple.

In step 1835, if the first transport protocol is TCP, the second transport protocol is TCP, the first SYN bit is set, the second SYN bit is set, the second ACK bit is set, the first source IP address is the same as the second destination IP address, the second source IP address is the same as the first destination IP address, the first source port is the same as the second destination port, and the second source port is the same as the first destination port, then a third packet that corresponds to either the first five-tuple or the second five-tuple is identified as part of the flow.

In another embodiment of this method, the flow is a session. In another embodiment of this method, the initiator of the first packet is called a client or session initiator. The initiator of the second packet is called a server or session responder.

In another embodiment of this method, the first five-tuple and the second five-tuple are recorded. In another embodiment of this method, a plurality of packets are identified that correspond to the first five-tuple or the second five-tuple.

In another embodiment of this method, the flow is terminated by a FIN bit sent by the session initiator, followed by an ACK bit sent by the session responder, followed by a FIN bit sent by the session responder, and followed by an ACK bit sent by the session initiator.

Figure 19:
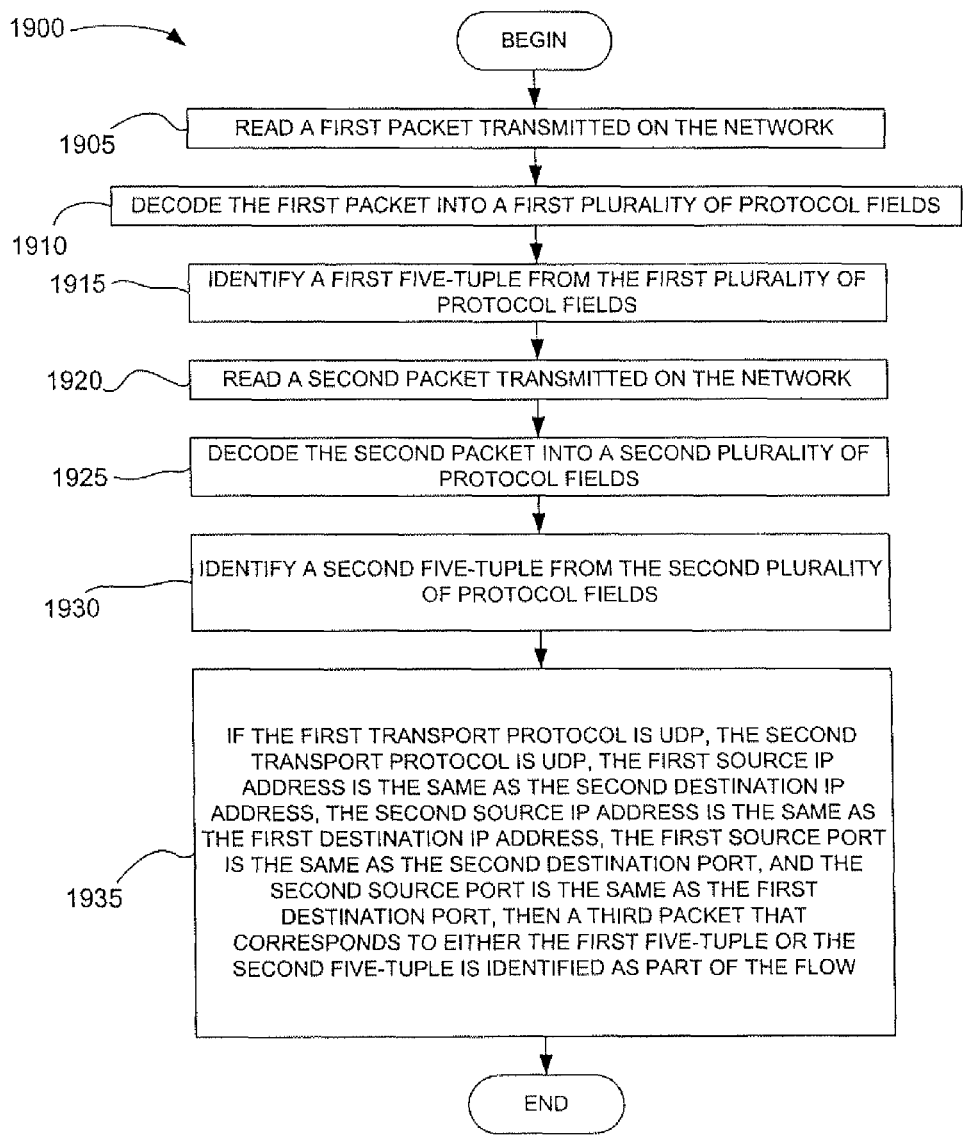
FIG. 19 is a flowchart showing a method for identifying user datagram protocol flow on a network, in accordance with an embodiment of the present invention.

FIG. 19 is a flowchart showing a method 1900 for identifying UDP flow on a network, in accordance with an embodiment of the present invention.

In step 1905 of method 1900, a first packet transmitted on the network is read.

In step 1910, the first packet is decoded into a first plurality of protocol fields.

In step 1915, a first five-tuple is identified from the first plurality of protocol fields. A first source IP address, a first destination IP address, a first transport protocol, a first source port, and a first destination port make up the first five-tuple.

In step 1920, a second packet transmitted on the network is read.

In step 1925, the second packet is decoded into a second plurality of protocol fields.

In step 1930, a second five-tuple is identified from the second plurality of protocol fields. A second source IP address, a second destination IP address, a second transport protocol, a second source port, and a second destination make up the second five-tuple.

In step 1935, if the first transport protocol is UDP, the second transport protocol is UDP, the first source IP address is the same as the second destination IP address, the second source IP address is the same as the first destination IP address, the first source port is the same as the second destination port, and the second source port is the same as the first destination port, then a third packet that corresponds to either the first five-tuple or the second five-tuple is identified as part of the flow.

In another embodiment of this method, the flow is a session. In another embodiment of this method, the initiator of the first packet is called a client or session initiator. The initiator of the second packet is called a server or session responder.

In another embodiment of this method, the first five-tuple and the second five-tuple are recorded. In another embodiment of this method, a plurality of packets are identified that correspond to the first five-tuple or the second five-tuple.

Confidence Assessment

Another embodiment of the present invention is a method for selecting an operating system of a host from the results of two or more techniques of operating system identification. In this method, each of the two or more techniques of operating system identification is used to identify an operating system on the host and produce a result. Each result is assigned a confidence value, or weight, based on the technique used to produce it. Two or more results are compared, and the result with the highest confidence value is selected as the operating system of the host.

Figure 20:
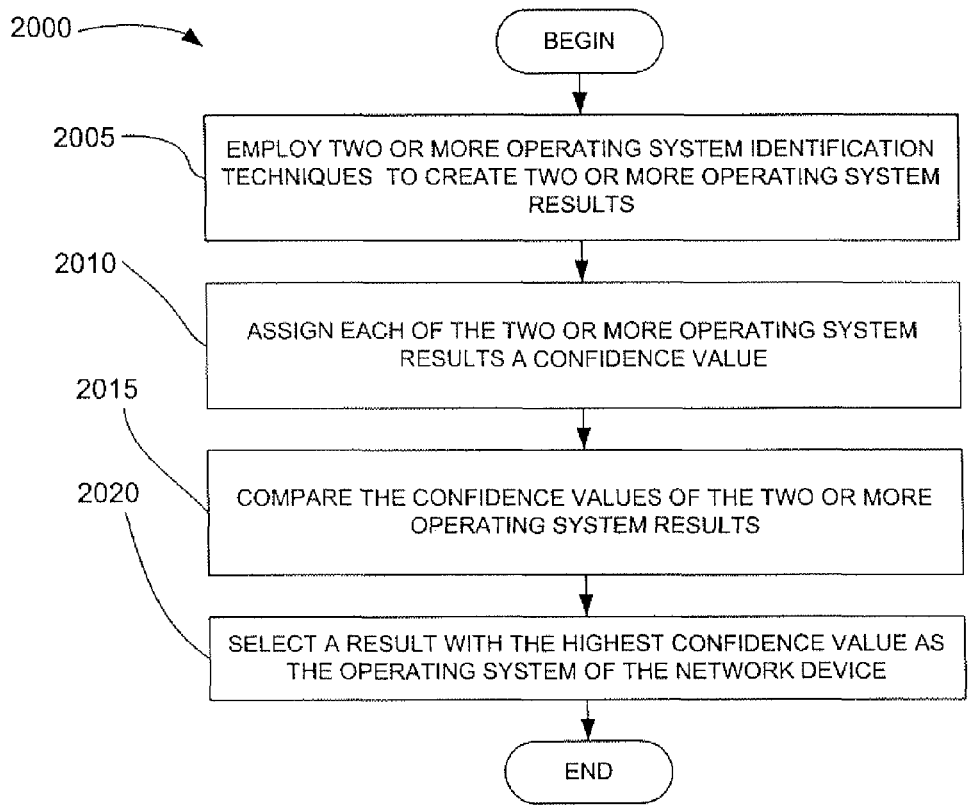
FIG. 20 is a flowchart showing a method for selecting an operating system of a network device from the results of two or more operating system identification techniques used in a passive network detection system, in accordance with an embodiment of the present invention.

FIG. 20 is a flowchart showing a method 2000 for selecting an operating system of a network device from the results of two or more operating system identification techniques used in a passive network detection system, in accordance with an embodiment of the present invention.

In step 2005 of method 2000, two or more operating system identification techniques are employed to create two or more operating system results.

In step 2010, each of the two or more operating system results is assigned a confidence value.

In step 2015, the confidence values of the two or more operating system results are compared.

In step 2020, the result with a highest confidence value is selected as the operating system of the network device.

In one embodiment of this method, higher confidence values are assigned to techniques of operating system identification that use protocol fields that are difficult to alter or that are not typically modified. For example, it is difficult to alter the chronological order of TCP options. Also, it is unlikely that timestamps have been modified to contain zero values.

In another embodiment of this method, confidence values are assigned based on a statistical formula. In another embodiment of this method, confidence values are assigned based on a decision-tree.

In another embodiment of this method, confidence values are assigned based on information gathered over time. This is required for situations such as dual boot systems or even the case where subsequently learned services or observed TCP packet values render valuable new information. An assessment method based on gathered information is capable of responding to conflicting data rather than simply attempting to confirm a behavior.

There are some observed behaviors that are individually unique enough to identify an operating system with a high degree of confidence. TCP timestamps with a zero value in both sent and received times on the SYN or SYN/ACK are a telltale sign of Windows™ operating systems. Certain versions of Solaris™ have the TCP option maximum segment size as the last or not the first option in a SYN/ACK packet. All other observed operating system behaviors set the maximum segment size as the first TCP option in the SYN/ACK packet. Linux 2.4 hosts by default usually respond to a SYN packet with a timestamp TCP option by sending a SYN/ACK packet that supports the timestamp. However, when the stimulus SYN packet is a Windows™ host that has zero timestamps, the response SYN/ACK does not support the timestamp.

In another embodiment of the present invention, a host is actively scanned to enhance the confidence assessment. This technique is used when the target operating system is not clear, and a stimulus packet may cause a host to respond in a manner that better identifies itself. For example, actively scanning with Internet control message protocol (ICMP) or UDP stimulus, such as used by nmap and xprobe utilities, provides identifying characteristics in a response. Alternatively, unlike the nmap or xprobe utilities, a small number of packets are sent to a host in order to distinguish its operating between one of two choices. This is more efficient than passively monitoring traffic for distinguishing characteristics protocols such as ICMP.

Another embodiment of the present invention is a method for selecting a service running on a host from the results of two or more techniques of service identification. In this method, each of the two or more techniques of service identification is used to identify a service running on the host and produce a result. Each result is assigned a confidence value, or weight, based on the technique used to produce it. Two or more results are compared, and the result with the highest confidence value is selected as the service running on the host.

Figure 21:
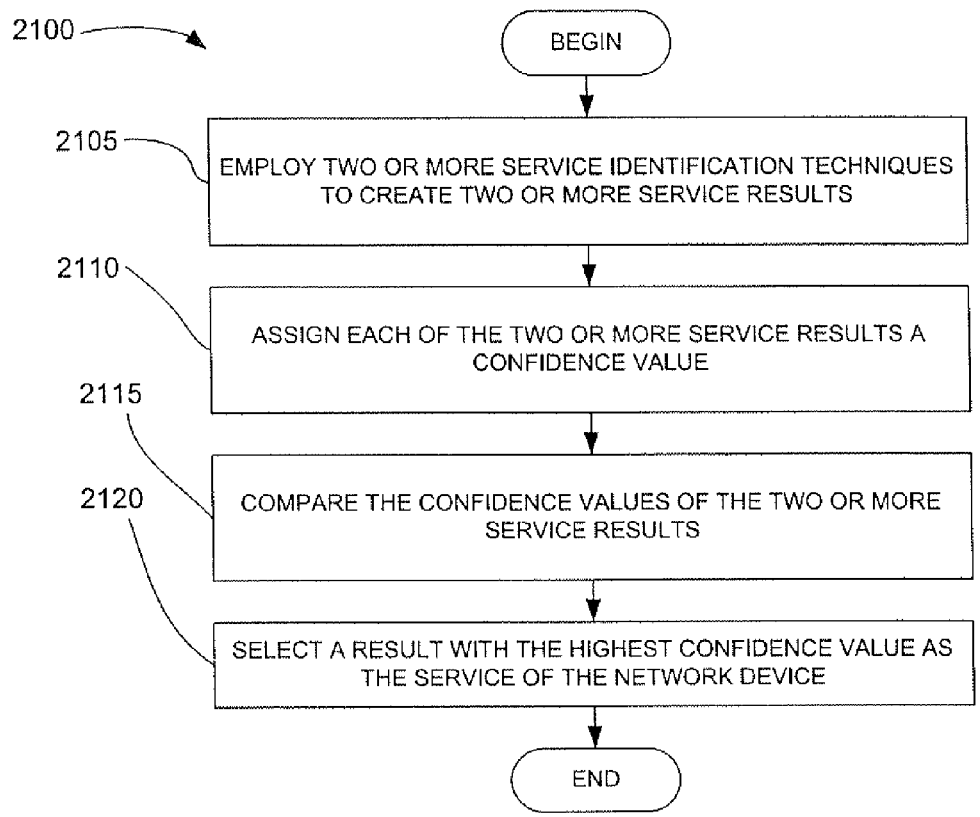
FIG. 21 is a flowchart showing a method for selecting a service of a network device from the results of two or more service identification techniques used in a passive network detection system, in accordance with an embodiment of the present invention.

FIG. 21 is a flowchart showing a method 2100 for selecting a service of a network device from the results of two or more service identification techniques used in a passive network detection system, in accordance with an embodiment of the present invention.

In step 2105 of method 2100, two or more service identification techniques are employed to create two or more service results.

In step 2110, each of the two or more service results is assigned a confidence value.

In step 2115, the confidence values of the two or more service results are compared.

In step 2120, the result with a highest confidence value is selected as the service of the network device.

In another embodiment of the present invention, the confidence value of an operating system result or service result is determined by considering if each subsequent result matches that, result. An initial confidence value is assigned as the confidence value of a result. The previous confidence value of the result is initially set to zero. One half of the absolute value of the difference between the confidence value and the previous confidence value is added to the confidence value for each successive match. This is the confirming increment value. For example, if a result is initially assigned a confidence value of 50, four successive matches have confidence values of 75, 87, 93, and 96, respectively.

Each non-match or different match subtracts from the confidence value. The amount subtracted for each non-match is the detracting increment value. The detracting increment value is one half of the confirming increment value. For example, if confidence is 75 with a confirm value of 12 and the next point does not match, the confidence value is 69. On each successive non-match the detracting increment value is doubled. If the detraction points come from the same IP address, the detracting increment value is reduced by a factor of 4.

Figure 22:
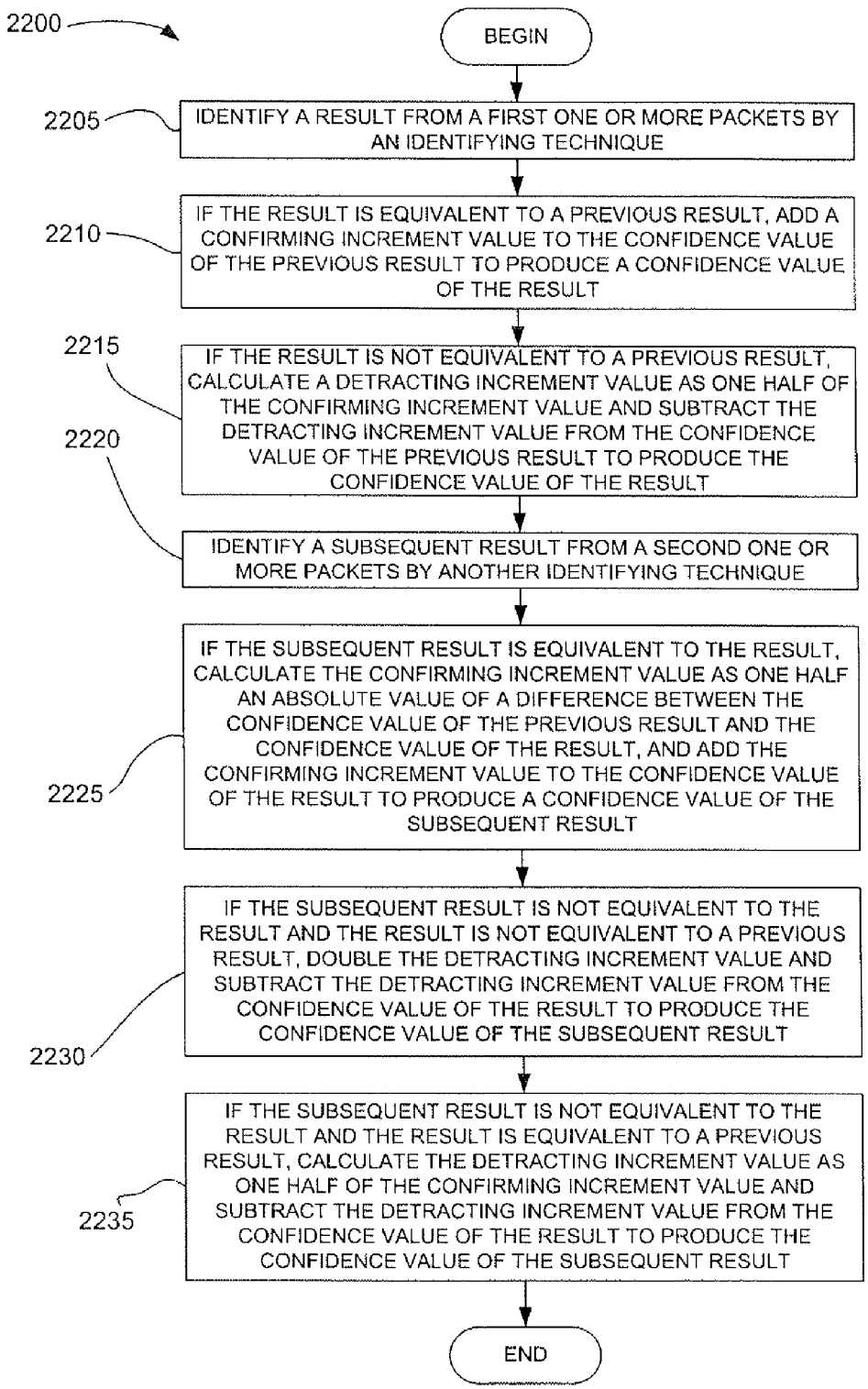
FIG. 22 is a flowchart showing a method for determining the confidence value of a result of an operating system or a service by considering previous results obtained by more than one identification technique used in a passive network detection system, in accordance with an embodiment of the present invention.

FIG. 22 is a flowchart showing a method 2200 for determining the confidence value of a result of an operating system or a service by considering previous results obtained by more than one identification technique used in a passive network detection system, in accordance with an embodiment of the present invention.

In step 2205 of method 2200, a result is identified from a first one or more packets by an identifying technique.

In step 2210, if the result is equivalent to a previous result, a confirming increment value is added to the confidence value of the previous result to produce a confidence value of the result. The confirming increment value is calculated as one half the absolute value of the difference between the confidence value of the previous result and the confidence value of the result.

In step 2215, if the result is not equivalent to a previous result, a detracting increment value is calculated as one half of the confirming increment value and the detracting increment value is subtracted from the confidence value of the previous result to produce the confidence value of the result.

In step 2220, a subsequent result is identified from a second one or more packets by another identifying technique.

In step 2225, if the subsequent result is equivalent to the result, the confirming increment value is calculated as one half an absolute value of a difference between the confidence value of the previous result and the confidence value of the result, and the confirming increment value is added to the confidence value of the result to produce a confidence value of the subsequent result.

In step 2230, if the subsequent result is not equivalent to the result and the result is not equivalent to a previous result, the detracting increment value is doubled and the detracting increment value is subtracted from the confidence value of the result to produce the confidence value of the subsequent result.

In step 2235, if the subsequent result is not equivalent to the result and the result is equivalent to a previous result, the detracting increment value is calculated as one half of the confirming increment value and the detracting increment value is subtracted from the confidence value of the result to produce the confidence value of the subsequent result.

For operating system fingerprinting methods, the maximum confidence value is scaled by the number of hops from the location at which packets are detected. The maximum confidence value is the difference between one hundred and twice the number of hops. The minimum maximum confidence value is fifty. The confirming increment value is also scaled by the number of hops from the location at which packets are detected. The confirming increment value is divided by one half the number of hops. The detracting increment value is not dependent on the number of hops from the location at which packets are detected. The minimum confirming increment value and the minimum detracting increment value is one.

Vulnerability Analysis

In another embodiment of the present invention, vulnerabilities are assigned to hosts discovered on a network. Vulnerabilities are known methods of maliciously gaining access to a host or host service, or maliciously attacking a host or host service. The vulnerabilities assigned to a host are derived from various sources. IDSs for example, maintain vulnerability lists.

A list of potential vulnerabilities is stored in a vulnerabilities database (VDB). When a host or host service is identified, one or more vulnerabilities from the VDB is mapped in real-time to the host or host service. These vulnerabilities are then displayed in a graphical user interface, linked to the particular host or service. An administrator, uses this information to patch specific systems or groups of systems.

Mapping vulnerabilities requires a normalized VDB. This database lists known vulnerabilities, mapping each one to the appropriate host operating system or service. It also requires that operating system and service fingerprints are normalized to values stored in the VDB.

Vulnerability lookups are performed real-time. As the information about a host is gathered and the host profile for the system is updated, the vulnerability lookup is also refined to take into account any new or changed data.

An exemplary VDB contains a list of vulnerabilities pulled from an IDS. In order for lookups to be performed into this database, the data is first normalized. This means that every product and vendor referenced in a vulnerability is listed in the database exactly once, and all vulnerabilities that reference this product or vendor point to the same record. Dependencies are also listed. If a vulnerability occurs for a specific application but only for a specific operating system, this relationship is itemized.

When operating system fingerprints are derived, they are mapped against the normalized operating system information in the VDB. If a fingerprint matches multiple possible operating systems, multiple mappings are created. When an operating system on a particular host is identified, a vulnerability lookup is performed to map to this host the vulnerabilities for this operating system.

In another embodiment of the present invention, operating system fingerprints are configurable. A utility is provided which allows users to select an operating system fingerprint definition from a host on their network. This tool prompts the user to select appropriate operating system mappings from the VDB. This tools allows users to customize the fingerprints and tailor the vulnerability lookups for the specific host types on their networks.

As with operating system fingerprints, service fingerprints are also mapped against the normalized product information in the VDB. The service type, name, vendor, and version are derived from the protocol. A dynamic mapping is created, based on a service type, a regular expression string matching of the product name, a vendor name, and a version, to products in the VDB. Once the service is mapped, a vulnerability lookup is performed. Any operating system or other service dependencies are handled at this time, such that only vulnerabilities that match all criteria are mapped.

In another embodiment of the present invention, a discovered host is actively scanned using vulnerabilities assigned from the VDB. In this way, the list of vulnerabilities for that host is refined from a list of all possible vulnerabilities to a smaller set of core vulnerabilities that an administrator must worry about. This elimination of vulnerabilities along with the lowering of the priority of vulnerabilities that have either already been patched on the target system or vulnerabilities that are not currently present due to the configuration of the service, allows the administrator to target efforts to resolve these vulnerabilities to the most critical problem areas.

Figure 23:
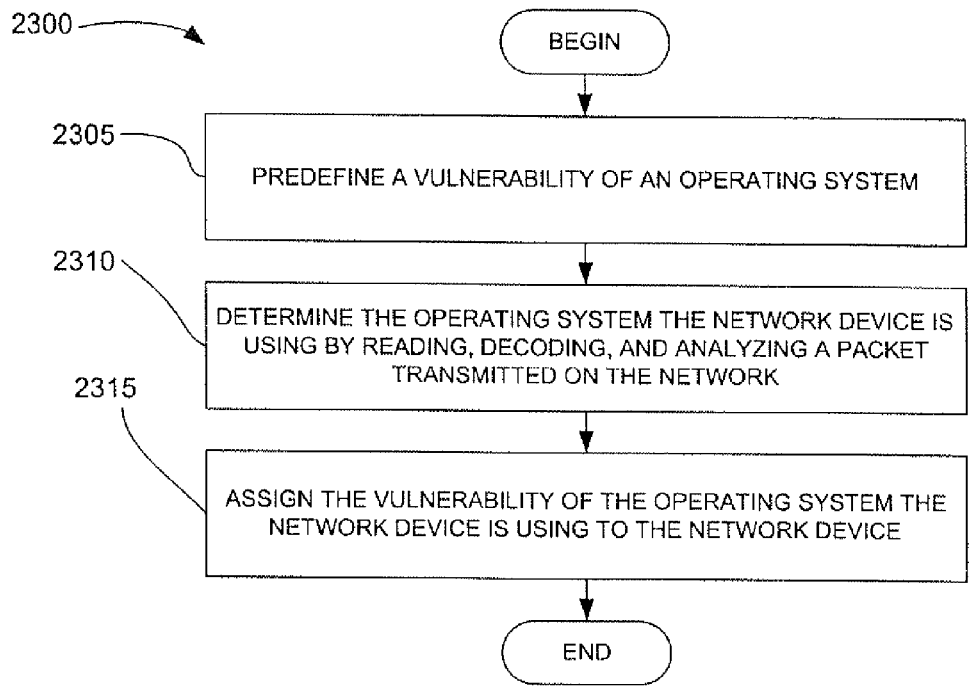
FIG. 23 is a flowchart showing a method for assigning a vulnerability to a network device on a network based on the operating system the network device is using, in accordance with an embodiment of the present invention.

FIG. 23 is a flowchart showing a method 2300 for assigning a vulnerability to a network device on a network based on the operating system the network device is using, in accordance with an embodiment of the present invention.

In step 2305 of method 2300, a vulnerability of an operating system is predefined.

In step 2310, the operating system the network device is using is determined by reading, decoding, and analyzing a packet transmitted on the network.

In step 2315, the vulnerability of the operating system the network device is using is assigned to the network device.

Figure 24:
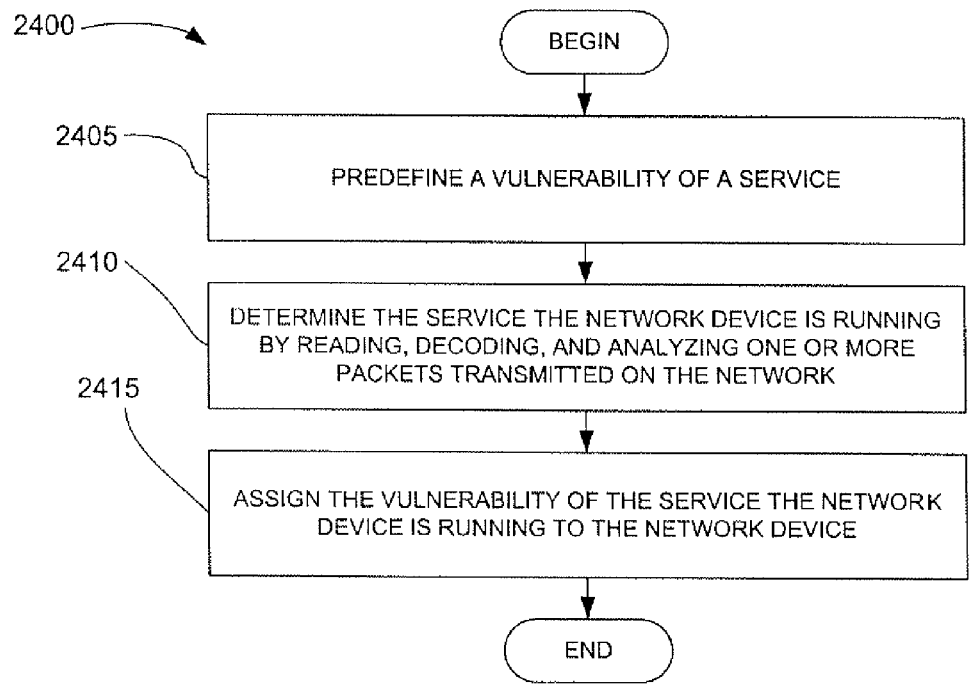
FIG. 24 is a flowchart showing a method for assigning a vulnerability to a network device on a network based on the service the network device is running, in accordance with an embodiment of the present invention.

FIG. 24 is a flowchart showing a method 2400 for assigning a vulnerability to a network device on a network based on the service the network device is running, in accordance with an embodiment of the present invention.

In step 2405 of method 2400, a vulnerability of a service is predefined.

In step 2410, the service the network device is running is determined by reading, decoding, and analyzing a packet transmitted on the network.

In step 2415, the vulnerability of the service the network device is running is assigned to the network device.

Figure 25:
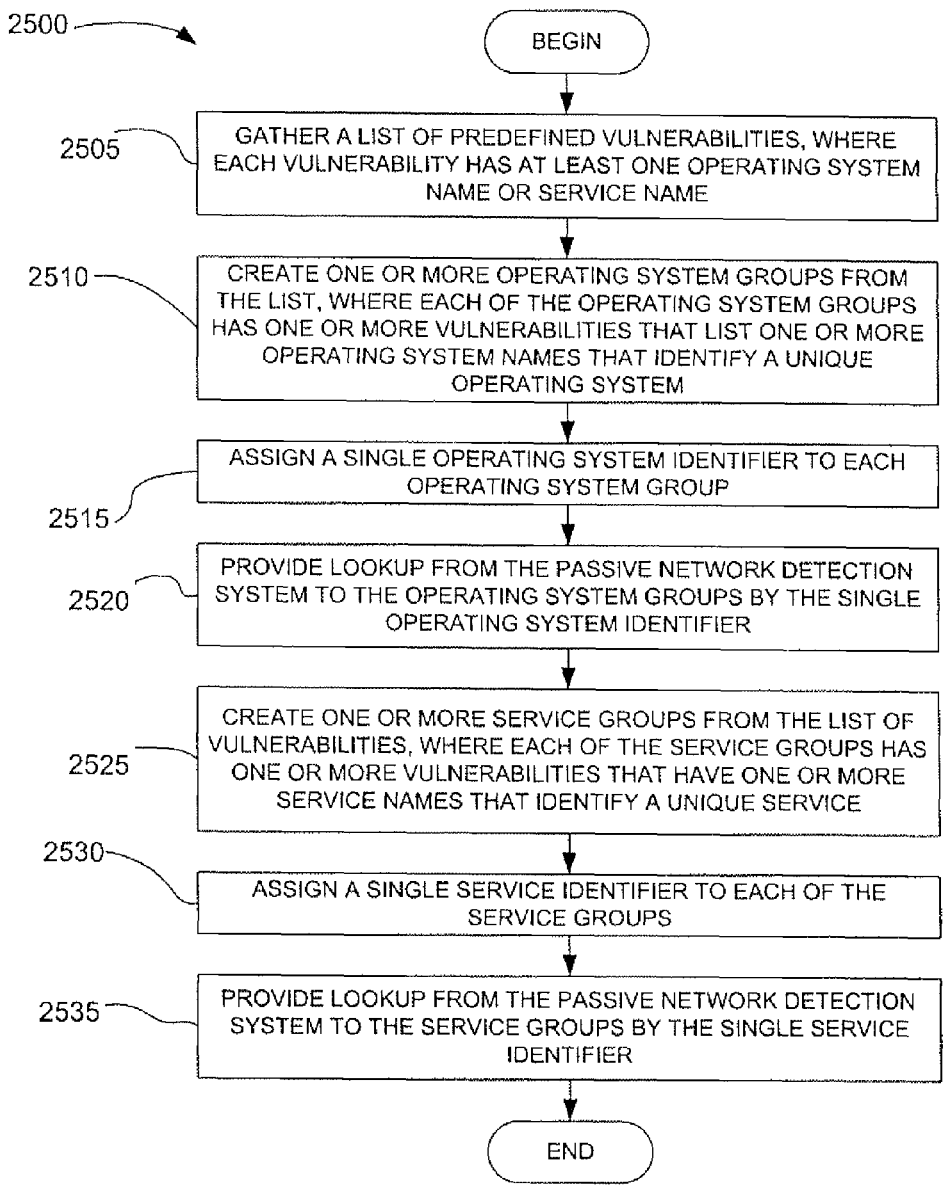
FIG. 25 is a flowchart showing a method for creating a normalized vulnerabilities database for use in a passive network detection system, in accordance with an embodiment of the present invention.

FIG. 25 is a flowchart showing a method 2500 for creating a normalized vulnerabilities database for use in a passive network detection system, in accordance with an embodiment of the present invention.

In step 2505 of method 2500, a list of predefined vulnerabilities is gathered, where each vulnerability has at least one operating system name or service name.

In step 2510, one or more operating system groups are created from the list, where each of the operating system groups has one or more vulnerabilities that list one or more operating system names that identify a unique operating system.

In step 2515, a single operating system identifier is assigned to each operating system group.

In step 2520, lookup is provided from the passive network detection system to the operating system groups by the single operating system identifier.

In step 2525, one or more service groups are created from the list of vulnerabilities, where each of the service groups has one or more vulnerabilities that have one or more service names that identify a unique service.

In step 2530, a single service identifier is assigned to each of the service groups.

In step 2535, lookup is provided from the passive network detection system to the service groups by the single service identifier.

Policy Analysis and Alerting

In another embodiment of the present invention, information passively discovered on a network is used to enforce a network configuration and usage policy. An action is performed if a usage policy is violated. Exemplary actions include alerting the user and denying network access based on the type of information discovered or when that information was discovered.

One exemplary usage policy is the prevention of unauthorized operating system usage. An action is triggered if a discovered operating system does not match the allowable operating system for the given IP address. For example, a user specifies that only Windows 2000™ and Windows XP™ may be used on the network. If a host with any other operating system detected, an alert would be generated and the offending host would be blocked at the firewall.

Another exemplary usage policy is the prevention of unauthorized service usage. An action is triggered if a prohibited service is detected. For example, the user specifies that service A is not permitted on subnet X. If service A is detected on subnet X, an alert is generated. In another example, a user specifies that for subnet Z, Linux is the only permitted operating system. Additionally, the only permitted services are secure shell (SSH) and secure sockets layer (SSL). An exception is made to allow host X to additionally run HTTP. Also, host Y is allowed to run Windows™ 2003 Server with no service restrictions. Any violations of this policy generates an alert.

Another exemplary usage policy is the qualification of events. The criticality of an alert is adjusted based on information gathered from multiple sources. For example, if an attack that only affects IIS is detected and the host is a Windows™ system running IIS, a critical alert is generated. If an attack that only affects IIS is detected and the host is a Linux system, which cannot run IIS, an informational alert is generated.

Another exemplary usage policy is defining a threshold for a single event. An action is triggered upon detecting multiple events of the same type within a given time period. For example, if ten failed login attempts to a single service are detected within a thirty second time period, an alert is generated to indicate a brute force login attempt. In another example, if fifteen failed login attempts followed by a successful login to a single service are detected within a forty-five second time period, an alert is generated to indicate a successful brute force login and the client system is blocked at the firewall.

Another exemplary usage policy is detecting IDS event sequences. An action is triggered upon detecting multiple events in a given sequence within a given time period. For example, the sequence of events E, F, and G destined for a single host is indicative of a successful compromise of a host. Individually, none of the events is considered critical and are ignored. However, when occurring sequentially within a 60 second time period they represent a critical event and generate a critical alert.

In another example, a buffer overflow attack is detected against a host and within 5 minutes a new telnet server is detected on the host. A critical alert is generated and the firewall blocks all traffic to and from the host.

Another exemplary usage policy is maintaining temporal constraints. An action is triggered upon detecting sessions established during prohibited times. For example, normal virtual private network (VPN) connections occur between the hours of 7:00 AM and 9:00 PM EST. A connection initiated at 2:00 AM generates an alert.

Another exemplary usage policy is maintaining statistical constraints. An action is triggered upon detecting deviations from normal operating parameters. For example, a web server that normally serves 30000 hits per hour is currently serving 5 hits per hour. An alert is generated.

Additional policy response actions include event logging to a local database, system logging a service message, performing a simple network management protocol (SNMP) trap, generating an e-mail message, controlling a network device (e.g. invoke a firewall rule or disable a network switch port), and raise or lower the priority of an IDS event.

The user configures a policy. The policy consists of a list of rules and groups of rules. Each rule and group of rules can be associated with a set of response actions. Each rule can be activated to become part of the active policy. As the nodes on the monitored networks change, events are generated to reflect the changes. If a new service is detected on a host, an event is generated that contains the new service information. The events and the data contained within the events are evaluated against the currently active policy. If the event or the data within the event causes the rule to fail, an event is generated that triggers the configured responses. If a node changes to the Windows™ operating system and a policy is written that prohibits the Windows™ operating system is in effect with an e-mail response action configured, an e-mail message is generated containing the event data and rule ID.

Figure 26:
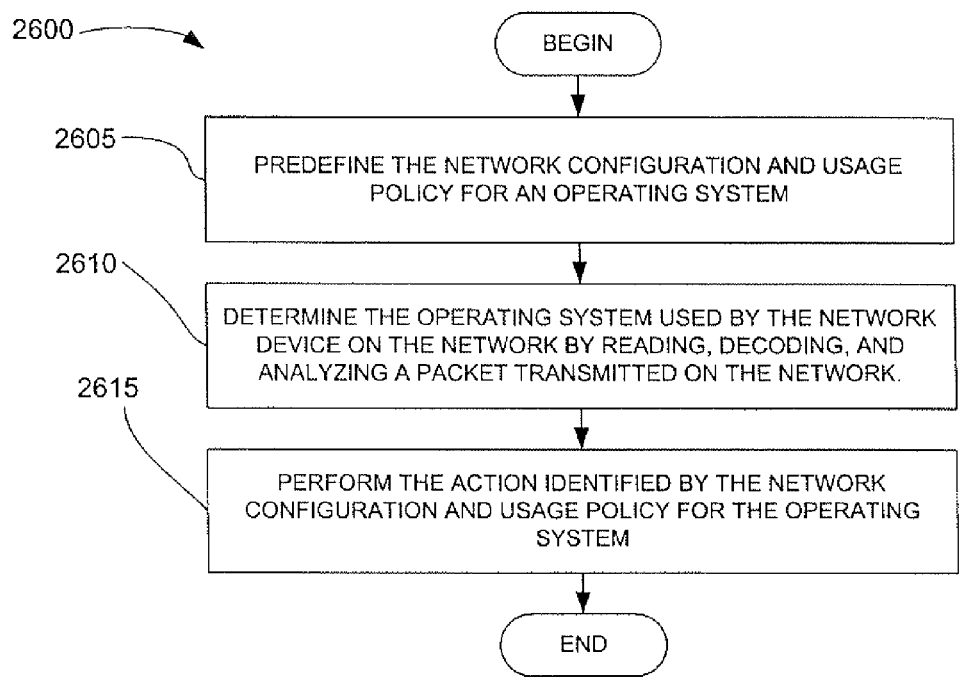
FIG. 26 is a flowchart showing a method for enforcing a network configuration and usage policy based on an operating system using a passive network detection system, in accordance with an embodiment of the present invention.

FIG. 26 is a flowchart showing a method 2600 for enforcing a network configuration and usage policy based on an operating system using a passive network detection system, in accordance with an embodiment of the present invention.

In step 2605 of method 2600, the network configuration and usage policy for an operating system is predefined.

In step 2610, the operating system used by the network device on the network is determined by reading, decoding, and analyzing a packet transmitted on the network.

In step 2615, an action identified by the network configuration and usage policy for the operating system is performed.

Figure 27:
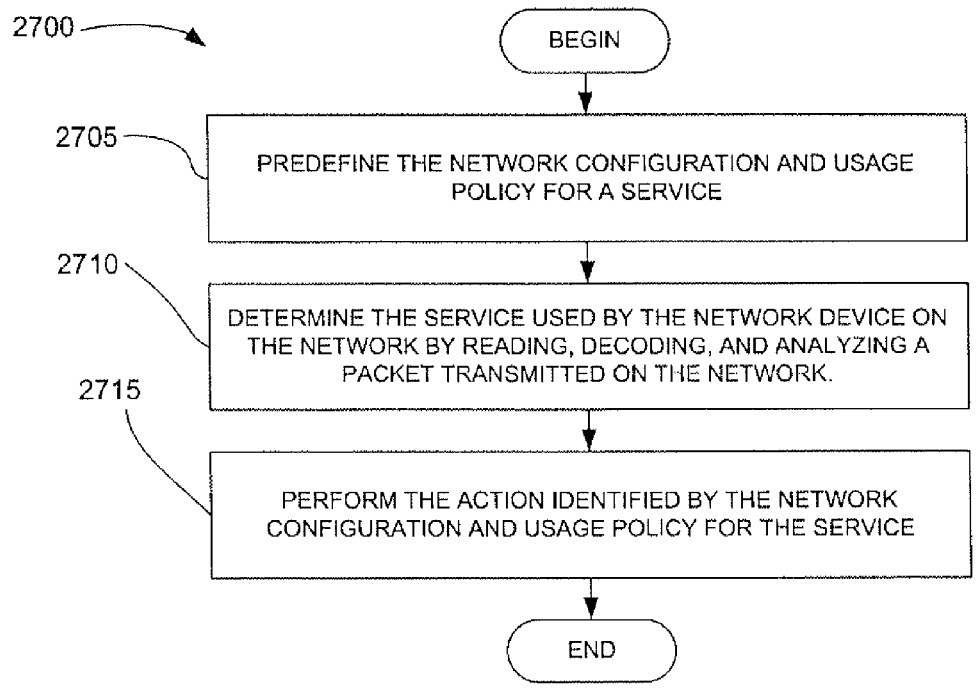
FIG. 27 is a flowchart showing a method for enforcing a network configuration and usage policy based on a service using a passive network detection system, in accordance with an embodiment of the present invention.

FIG. 27 is a flowchart showing a method 2700 for enforcing a network configuration and usage policy based on a service using a passive network detection system, in accordance with an embodiment of the present invention.

In step 2705 of method 2700, the network configuration and usage policy for a service is predefined.

In step 2710, the service used by the network device on the network is determined by reading, decoding, and analyzing a packet transmitted on the network.

In step 2715, an action identified by the network configuration and usage policy for the service is performed.

Figure 28:
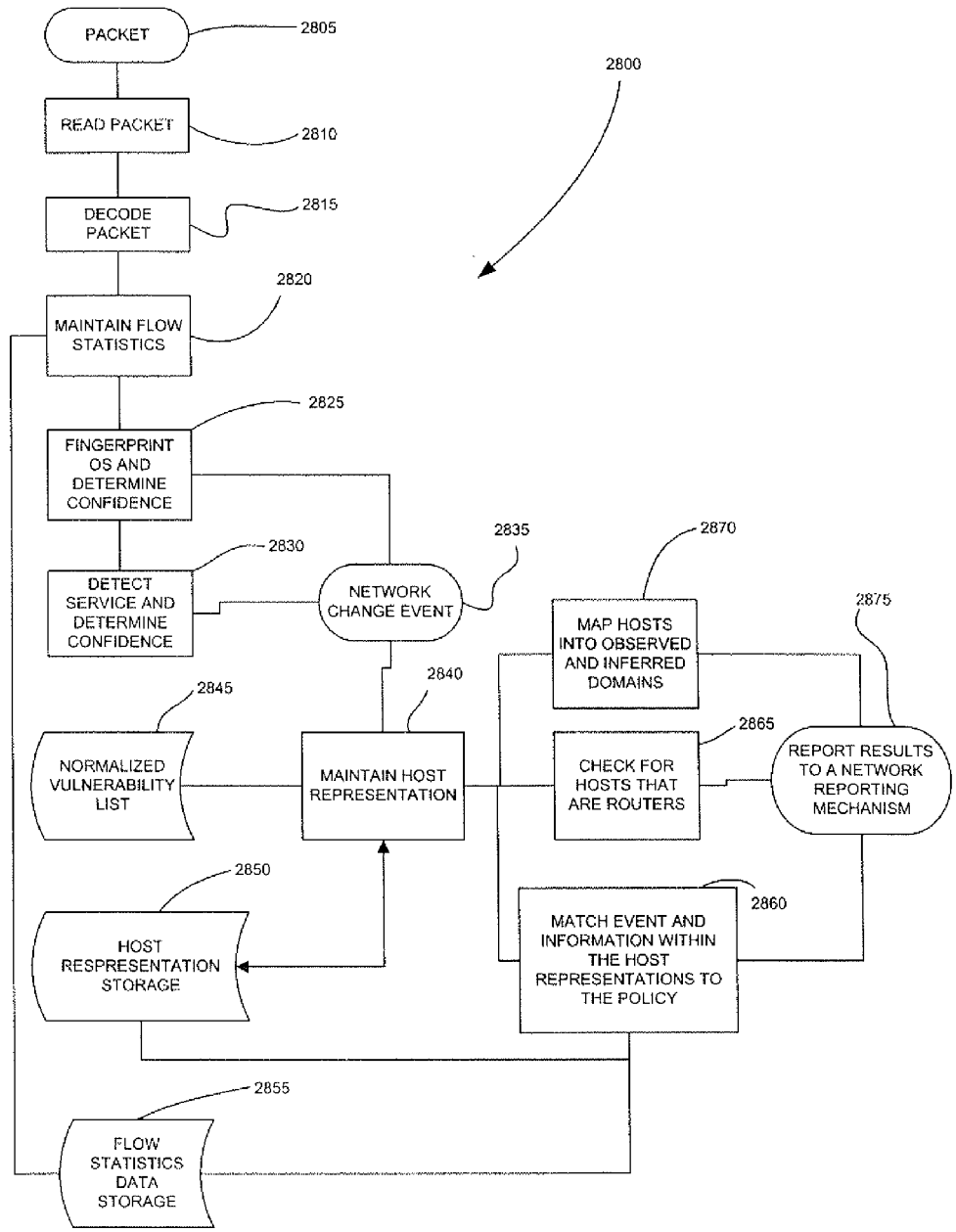
FIG. 28 is a schematic diagram illustrating a passive network detection system, in accordance with an embodiment of the present invention.

FIG. 28 is a schematic diagram illustrating a passive network detection system, in accordance with an embodiment of the present invention.

In system 2800, packet 2805 is read by packet reader 2810. Packet decoder 2815 decodes packet 2805. Flow analyzer 2820 identifies a flow from two or more decoded packets. Flow analyzer 2820 also maintains flow statistics. Operating system detector 2825 receives decoded packets from flow analyzer 2820, detects one or more operating systems using one or more identification techniques, and selects an operating system from the one or more operating systems using confidence assessment. Service detector 2830 receives decoded packets from operating system detector 2825, detects an one or more services using one or more identification techniques, and selects a service from the one or more operating systems using confidence assessment. Network change monitor 2835 monitors network device operating system and service changes. Host representation monitor 2840 monitors changes to operating systems and services detected on the network. Normalized vulnerability list 2845 groups vulnerabilities by operating system and service and provides vulnerabilities to host representation monitor. Host representation storage 2850 stores operating system and service information that is detected and sends information to and receives information from host representation monitor 2840. Flow analysis data storage 2855 receives the flow statistics gathered by flow analyzer 2820. Policy component 2860 enforces network configuration rules based on information received from host representation storage 2850 and information received from flow analysis data storage 2855. Network topology component 2865 identifies routers on the network. Mapping component 2870 assigns detected network devices to subnets. Results reporter 2875 reports policy, network topology, and mapping information to a network reporting mechanism.

In accordance with an embodiment of the present invention, instructions adapted to be executed by a processor to perform a method are stored on a computer-readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed"

and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications.

A system and method in accordance with an embodiment of the present invention disclosed herein can advantageously improve existing intrusion detection systems or real-time network reporting mechanisms by giving them contextual information about a computer network. Such a system and method is particularly advantageous in comparison to manual methods in that its information is updated automatically. The ability of the present invention to discover the operating systems of both servers and clients is an important advantage over conventional network detection systems. It is advantageous in comparison to active scanning systems in that it is not destructive to the network, it can provide relevant information to an IDS and its information is always up to date. It can be used to provide information to enhance intrusion detection systems or to provide continuous real-time reports of the status of the network. It can discover the operating systems of both servers and clients.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the claims, and by their equivalents.

What is claimed is:

1. A method for passively and automatically enforcing a network configuration and usage policy on a network, comprising:
   predefining the network configuration and usage policy for a service specific to network devices on the network;
   passively determining, at a processor disposed between a source device and a destination device, in response to plural protocol fields in one packet transmitted on the network from the source device to the destination device, that one of the network devices on the network is running the service by reading, decoding, and analyzing one or more packets transmitted on the network, by comparing the plural protocol fields in the one packet to a service identifying structure to determine the service, wherein the packet is in traffic passively moving across the network;
   performing an action at the processor, the action being identified by the network configuration and usage policy as being for the service specific to the one of the network devices that was passively determined from the packet, the action being different for different services; and
   identifying two or more service events by reading, decoding, and analyzing two or more packets transmitted on the network for each of the two or more service events, the protocol fields being network, transport, and application protocol fields,
   wherein the network configuration and usage policy for the service comprises identifying if the two or more service events are of a same type and if a number of the two or more service events of the same type exceeds a threshold number of service events within a predefined time period.

2. A method for passively and automatically enforcing a network configuration and usage policy on a network, comprising:
   predefining the network configuration and usage policy for a service specific to network devices on the network;
   passively determining, at a processor disposed between a source device and a destination device, in response to plural protocol fields in one packet transmitted on the network from the source device to the destination device, that one of the network devices on the network is running the service by reading, decoding, and analyzing one or more packets transmitted on the network, by comparing the plural protocol fields in the one packet to a service identifying structure to determine the service, wherein the packet is in traffic passively moving across the network;
   performing an action at the processor, the action being identified by the network configuration and usage policy as being for the service specific to the one of the network devices that was passively determined from the packet, the action being different for different services; and
   identifying two or more service events by reading, decoding, and analyzing two or more packets transmitted on the network for each of the two or more service events, the protocol fields being network, transport, and application protocol fields,
   wherein the network configuration and usage policy for the service comprises determining if a number of the two or more service events is within a range of predefined numbers for the service.

3. A non-transitory computer-readable medium comprising instructions for execution by a processor, the instructions including a computer-implemented method for passively and automatically enforcing a network configuration and usage policy on a network, the instructions for implementing:
   predefining the network configuration and usage policy for a service specific to network devices on the network;
   passively determining, at a processor disposed between a source device and a destination device, in response to plural protocol fields in one packet transmitted on the network from the source device to the destination device, that one of the network devices on the network is running the service by reading, decoding, and analyzing one or more packets transmitted on the network, to determine the service being run by the network device, by comparing the plural protocol fields in the one packet to a service identifying structure to determine the service wherein the packet is in traffic passively moving across the network, the service identifying structure being previously stored at the processor and maintained at the processor;
   performing an action at the processor, the action being identified by the network configuration and usage policy as being for the service specific to the one of the network devices that was passively determined from the packet, the action being different for different services,
   the protocol fields being network, transport, and application protocol fields; and identifying two or more service events by reading, decoding, and analyzing two or more packets transmitted on the network for each of the two or more service events, wherein the network configuration and usage policy for the service comprises identifying if the two or more service events are of a same type and if a number of the two or more service events of the same type exceeds a threshold number of service events within a predefined time period.

4. A non-transitory computer-readable medium comprising instructions for execution by a processor, the instructions including a computer-implemented method for passively and automatically enforcing a network configuration and usage policy on a network, the instructions for implementing:

predefining the network configuration and usage policy for user/ice specific network devices on the network;

passively determining, at a processor disposed between a source device and a destination device, in response to plural protocol fields in one packet transmitted on the network from the source device to the destination device, that one of the network devices on the network is running the service by reading, decoding, and analyzing one or more packets transmitted on the network, to determine the service being run by the network device, by comparing the plural protocol fields in the one packet to a service identifying structure to determine the service, wherein the packet is in traffic passively moving across the network, the service identifying structure being previously stored at the processor and maintained at the processor;

performing an action at the processor, the action being identified by the network configuration and usage policy as being for the service specific to the one of the network devices that was passively determined from the packet, the action being different for different services, the protocol fields being network, transport and application protocol fields; and identifying two or more service events by reading, decoding, and analyzing two or more packets transmitted on the network for each of the two or more service events, wherein the network configuration and usage policy for the service comprises determining if a number of the two or more service events is within a range of predefined numbers for the service.

* * * * *